(12) United States Patent
Ra

(10) Patent No.: US 8,023,061 B2
(45) Date of Patent: Sep. 20, 2011

(54) DISPLAY SYSTEM

(75) Inventor: Dong-Gyun Ra, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 616 days.

(21) Appl. No.: 12/179,407

(22) Filed: Jul. 24, 2008

(65) Prior Publication Data

US 2009/0190059 A1    Jul. 30, 2009

(30) Foreign Application Priority Data

Jan. 28, 2008   (KR) .................. 10-2008-0008506

(51) Int. Cl.
    *G02F 1/1333*    (2006.01)
(52) U.S. Cl. ................... 349/58; 349/1; 349/64

(58) Field of Classification Search .................. None
See application file for complete search history.

(56) References Cited

U.S. PATENT DOCUMENTS 5,825,476 A * 10/1998 Abitol et al. .............. 356/124
* cited by examiner

*Primary Examiner* — Lucy P Chien
(74) *Attorney, Agent, or Firm* — F. Chau & Associates LLC.

(57) ABSTRACT

A display system includes a housing member which has space therein, a plurality of light source units which are placed in the space, a diffusion member which is disposed on the light source units, a liquid crystal display panel which is disposed on the diffusion member, an infrared camera unit which is interposed between the liquid crystal display panel and the diffusion member and photograph a front region of the liquid crystal display panel, and a plurality of infrared light sources which emit infrared light to the front region of the liquid crystal display panel.

13 Claims, 17 Drawing Sheets

(a) (b)

DISPLAY SYSTEM

CROSS-REFERENCE TO RELATED APPLICATION

This application claims priority from Korean Patent Application No. 10-2008-0008506 filed on Jan. 28, 2008, the disclosure of which is incorporated herein by reference in its entirety.

BACKGROUND OF THE INVENTION

1. Technical Field

The present disclosure relates to a display system, and more particularly, to a display system including a flat display panel using surface computing technology.

2. Discussion of the Related Art

Surface computing technology enables a computer to receive information about photographs, documents or objects through a screen thereof or receive information about touches on the screen. The received information is processed by the surface computing technology. A display system using the surface computing technology displays images on a screen thereof by using a projector and senses the motion of a user or an object by using an infrared camera. Thus, the display system displays an image corresponding to specified data on the screen thereof. The display system senses the motion of a user or an object outside the screen and receives data corresponding to the sensed motion.

When a liquid crystal display (LCD) is used as the screen of the display system, the LCD requires an external light source such as a backlight to provide light to a liquid crystal display panel while the surface computing technology requires an infrared camera. In addition, a diffusion plate is interposed between the backlight and the liquid crystal display to enhance luminance uniformity and visibility of the liquid crystal display panel. However, when the diffusion plate and the liquid display panel are coupled to each other, and the diffusion plate is placed under the liquid crystal display panel, infrared light is diffused by the diffusion plate. As a result, the object detection capability of the infrared camera deteriorates. If the diffusion plate is removed to enhance the object detection capability of the infrared camera, the luminance uniformity and visibility of the liquid crystal display panel deteriorate.

SUMMARY OF THE INVENTION

In exemplary embodiments of the present invention, a display system implements surface computing technology, enhances luminance uniformity of a liquid crystal display (LCD), improves object detection capability of an infrared camera, and improves assembling qualities.

According to an exemplary embodiment of the present invention, a display system includes a housing member which has space therein, a plurality of light source units which are placed in the space, a diffusion member which is disposed on the light source units, a liquid crystal display panel which is disposed on the diffusion member, an infrared camera unit which is interposed between the liquid crystal display panel and the diffusion member and photograph a front region of the liquid crystal display panel, and a plurality of infrared light sources which emit infrared light to the front region of the liquid crystal display panel.

The infrared camera unit may be placed diagonally under the liquid crystal display panel, and an angle formed by a center view-angle line of the infrared camera unit and a bottom surface of the liquid crystal display panel may be about 40° to about 70°.

The angle formed by the center view-angle line of each of the infrared camera unit and the bottom surface of the liquid crystal display panel may be about 50° to about 60°.

The system may further include a mold frame which is coupled to an upper region of the housing member and fixes the liquid crystal display panel; an image controller which controls the operation of the liquid crystal display panel, and a computing unit which controls the operation of the infrared camera units and the infrared light sources and controls the image controller based on outputs of the infrared camera units.

The mold frame may include a body which is shaped like a four-sided polygon and fixes and supports the liquid crystal display panel, and mold sidewalls which extend downward from edges of the body, respectively, and have lower ends coupled to the housing member, wherein the infrared camera units are placed under the body of the mold frame.

The mold frame may include a fixing protrusion which protrudes from a region of each of the mold sidewalls between the housing member and the body or a concave groove which is cut into a region of each of the mold sidewalls between the housing member and the body, wherein each of the infrared camera units is fixed onto the fixing protrusion or the concave groove, and a surface of the fixing protrusion or the concave groove, which contacts each of the infrared camera units, tilts.

The infrared light sources may be disposed under the diffusion member, on the mold sidewalls of the mold frame, or on the fixing protrusion or the concave groove.

A portion of an upper end region of the housing member, which is coupled to the mold frame, may protrude, and each of the infrared camera units may be placed on the protruding portion.

The space within the housing member may be larger than the liquid crystal display panel, and an angle formed by a virtual line, which connects a lower end of the liquid crystal display panel and an upper end of the housing member, and the bottom surface of the liquid crystal display panel may be about 30° to about 55°.

A plurality of infrared cameras may be placed adjacent to each long side, each short side, or long and short sides of the liquid crystal display panel, and each of the infrared camera units may include a mounting substrate and an infrared camera mounted on the mounting substrate.

Each of the infrared camera units may photograph an area, which corresponds to at least half of a length of a long side of the liquid crystal display panel, if the infrared camera units are placed adjacent to the short side of the liquid crystal display panel, and each of the infrared camera units may photograph an area, which corresponds to at least half of a length of a short side of the liquid crystal display panel, if the infrared cameras units are placed adjacent to the long side of the liquid crystal display panel.

The infrared light sources may be mounted on the mounting substrate.

The system may further include a cover unit which covers upper edge regions of the liquid crystal display panel, and the infrared light sources may be disposed under the cover unit.

According to an exemplary embodiment of the present invention, a display system includes a liquid crystal display panel which displays images, a housing member which includes a plurality of sidewalls coupled to each other to form a pillar whose lower region is smaller than an upper region thereof, an upper mold frame which is coupled to an upper region of the housing member and thus fixes the liquid crystal display panel, a plurality of diffusion members which are disposed adjacent to the sidewalls, respectively, and exposes a portion of a lower region of the housing member, a plurality of light source units which are interposed between the sidewalls and the diffusion members, respectively, and an infrared detector which is disposed in the exposed portion of the lower region of the housing member and detects an object located in a front region of the liquid crystal display panel by using infrared light.

The housing member may include a bottom plate which is coupled to the sidewalls in the lower region thereof, and the infrared detector may include an infrared camera which detects infrared light reflected by the object in the front region of the liquid crystal display panel, infrared light sources which are disposed around the infrared camera and emit infrared light, and a mounting substrate on which the infrared camera and the infrared light sources are mounted, wherein the mounting substrate may be disposed on the bottom plate, and a fixing groove, into which each of the diffusion members is inserted, or a fixing protrusion, which supports and fixes each of the diffusion members, may be formed in each of the mounting substrate and the upper mold frame.

The system may further include a lower mold frame which is coupled to the sidewalls in the lower region of the housing member, wherein the infrared detector includes an infrared camera which detects infrared light reflected by the object in the front region of the liquid crystal display panel, infrared light sources which are disposed around the infrared camera and emit infrared light, and a mounting substrate on which the infrared camera and the infrared light sources are mounted, wherein the mounting substrate is inserted into the lower mold frame, and a fixing groove, into which each of the diffusion members is inserted, or a fixing protrusion, which supports and fixes each of the diffusion members, is formed in each of the upper mold frame and the lower mold frame.

The infrared detector may include an infrared camera which detects infrared light reflected by the object in the front region of the liquid crystal display panel, infrared light sources which are disposed around the infrared camera and emit infrared light; and a mounting substrate on which the infrared camera and the infrared light sources are mounted, wherein the mounting substrate is coupled to the sidewalls in the lower region of the housing member, and a fixing groove, into which each of the diffusion members is inserted, or a fixing protrusion, which supports and fixes each of the diffusion members, is formed in each of the mounting substrate and the upper mold frame.

Each of the sidewalls may be shaped like a trapezoidal plate whose upper side is longer than a lower side, and at least part of each of the sidewalls may be inserted into a slit-shaped concave groove of each coupler.

Each of the light sources units may include a plurality of lamp units which have the same tube current; and one or more inverter units which supply power to the lamp units, wherein each of the lamp units uses any one of a cold cathode fluorescent lamp (CCFL), an external electrode fluorescent lamp (EEFL), a light-emitting diode, and a bar-type substrate on which a plurality of light-emitting diodes are mounted as a light source, and a density of light sources per unit area is increased from an upper side region of each of the sidewalls towards a lower side region thereof.

The housing member may further include a partition wall which partitions the lower region of the housing member into a plurality of regions, an inner diffusion member which is disposed adjacent to the partition wall, and an inner light source unit which is interposed between the partition wall and the inner diffusion member, wherein the infrared detector includes a plurality of infrared detection members which are disposed in the regions into which the lower region of the housing member is partitioned.

BRIEF DESCRIPTION OF THE DRAWINGS

Exemplary embodiments of the present invention can be understood in more detail from the following description taken in conjunction with the accompanying drawings, in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein. It will be understood that when an element or layer is referred to as being "on" another element or layer, the element or layer can be directly on another element or layer or intervening elements or layers.

Figure 1:
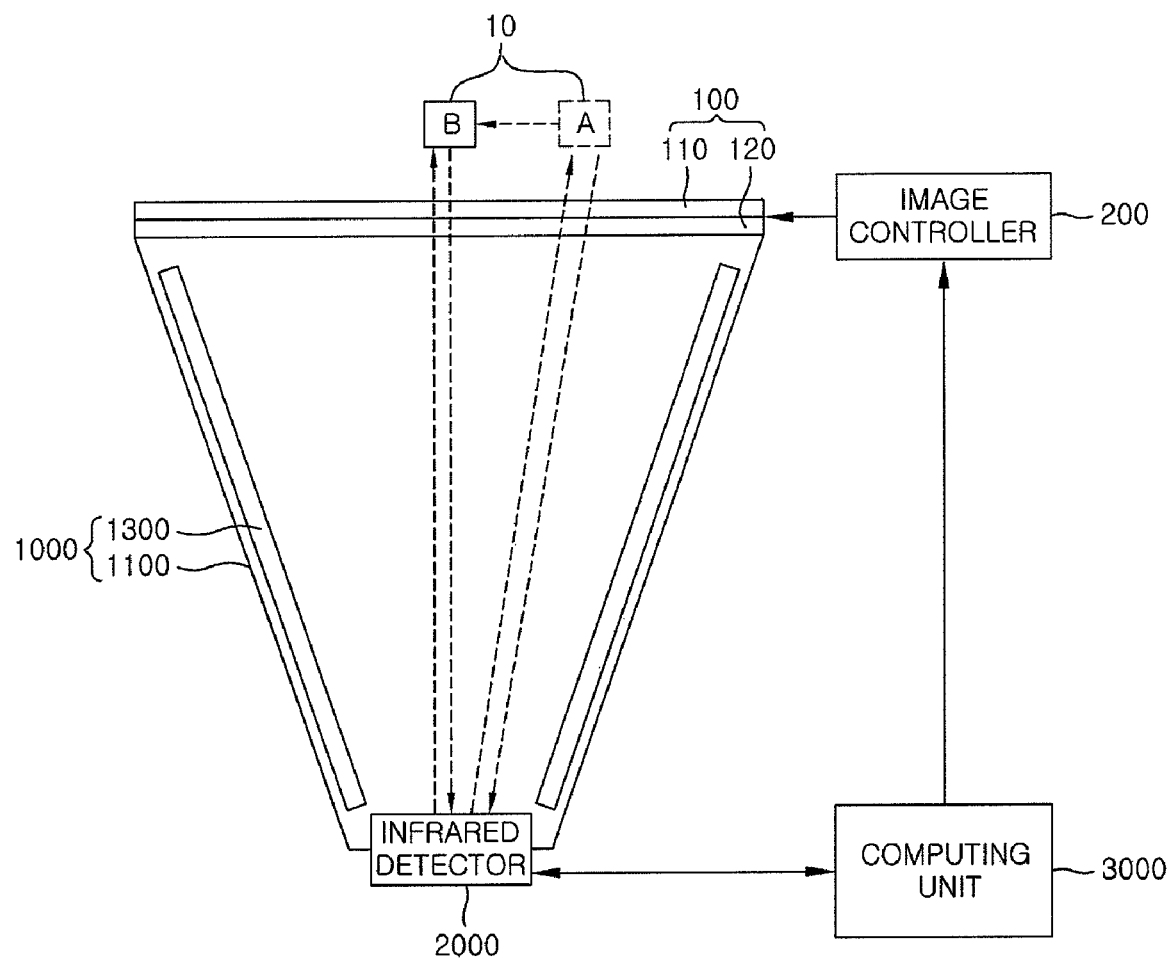
FIG. 1 is a block diagram of a display system according to an exemplary embodiment of the present invention.
Figure 2:
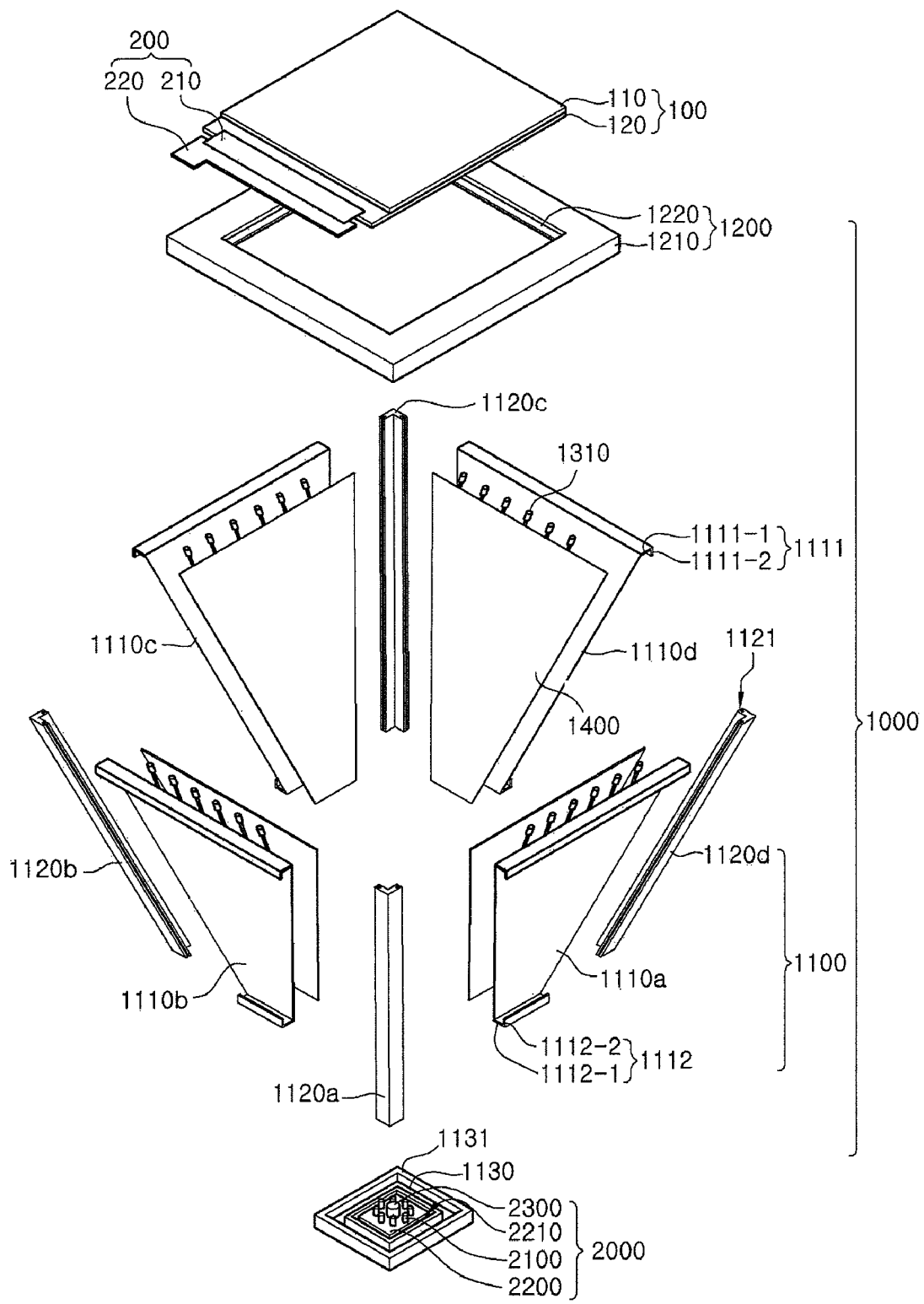
FIG. 2 is an exploded perspective view of a display system according to an exemplary embodiment of the present invention.
Figure 3:
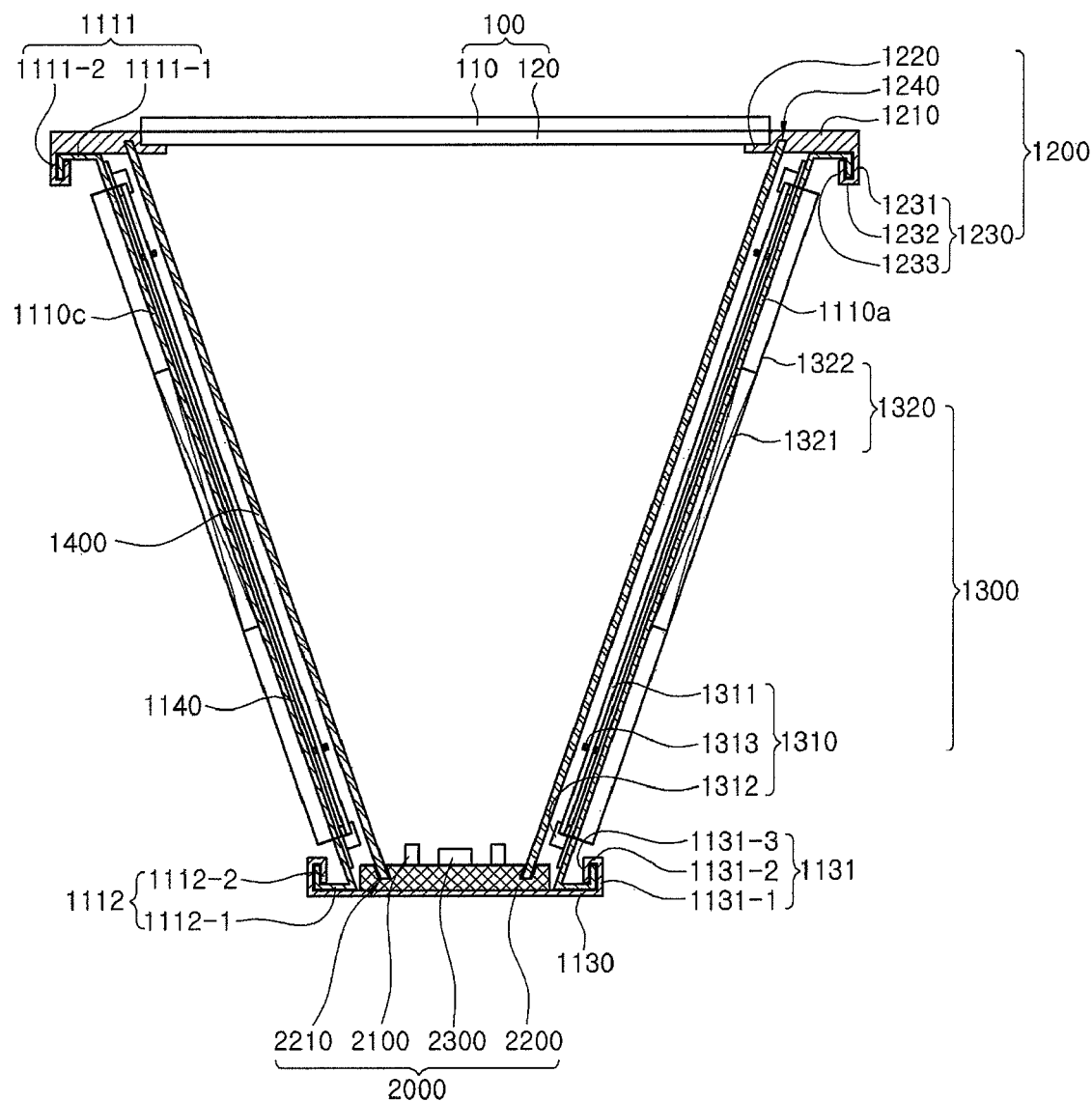
FIG. 3 is a vertical cross-sectional view of a display system according to an exemplary embodiment of the present invention.
Figure 4:
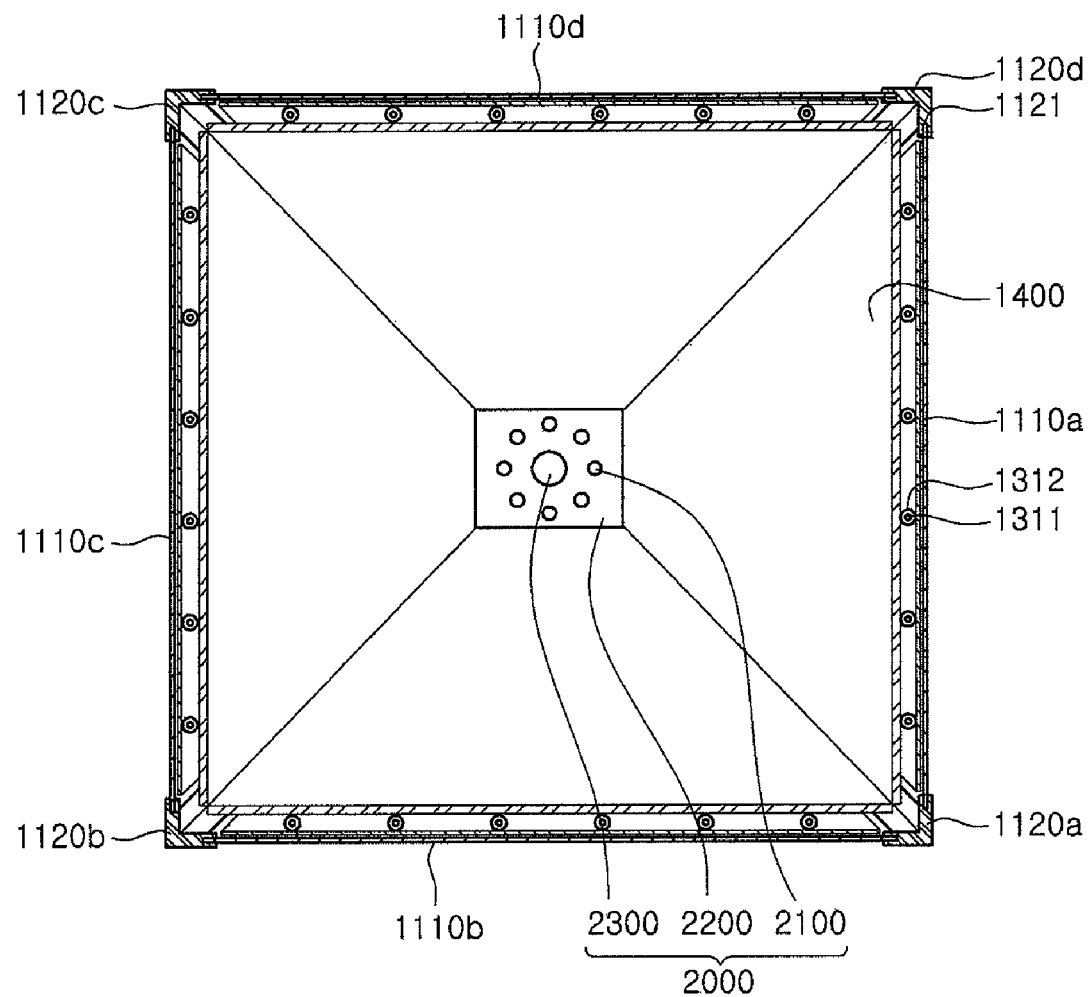
FIG. 4 is a horizontal cross-sectional view of a display system according to an exemplary embodiment of the present invention.
Figure 5:
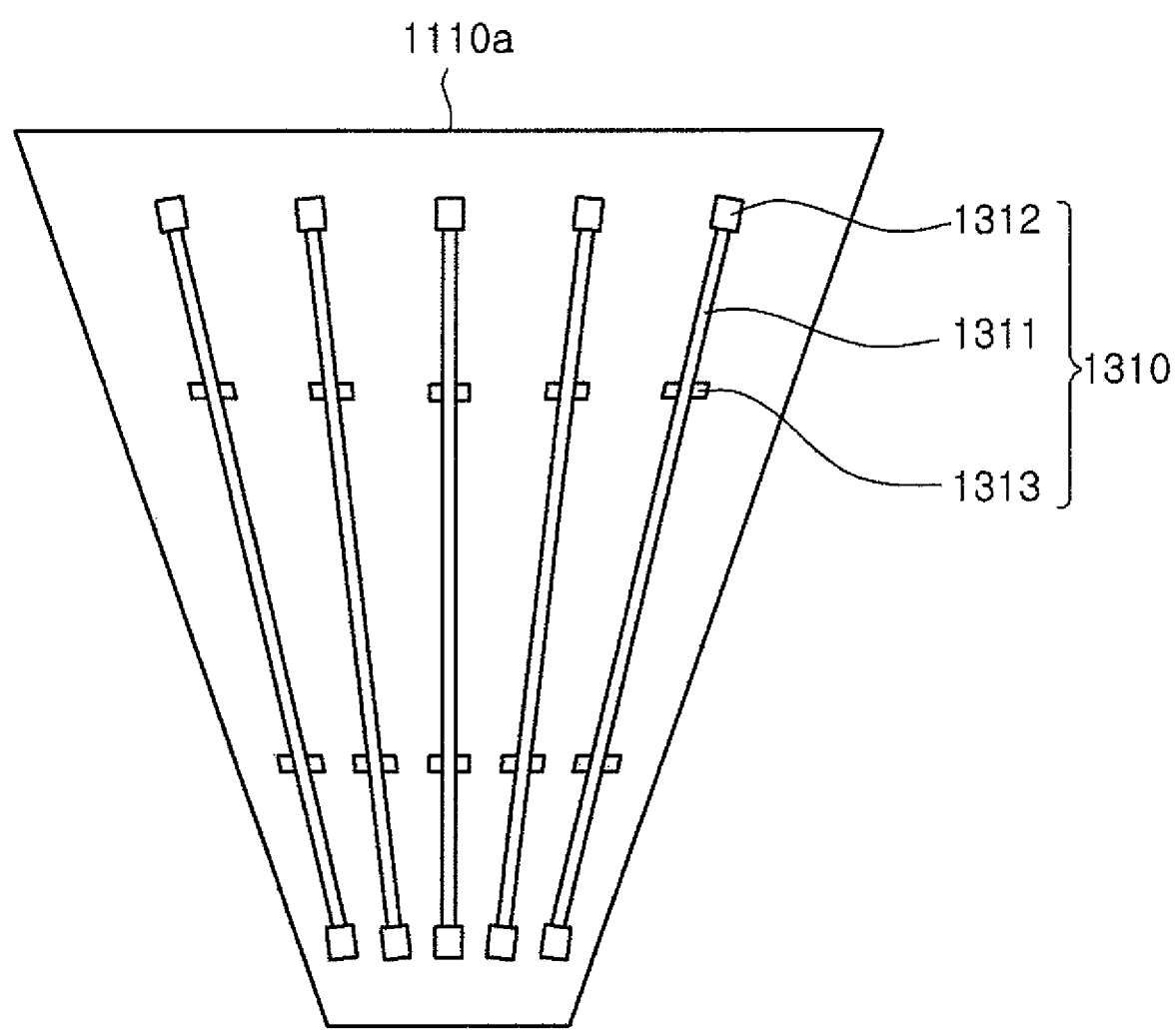
FIG. 5 is a plan view of one of sidewalls of a housing member according to an exemplary embodiment of the present invention.

FIG. 1 is a block diagram of a display system according to an exemplary embodiment of the present invention. FIG. 2 is an exploded perspective view of a display system according to an exemplary embodiment of the present invention. FIG. 3 is a vertical cross-sectional view of a display system according to an exemplary embodiment of the present invention. FIG. 4 is a horizontal cross-sectional view of a display system according to an exemplary embodiment of the present invention. FIG. 5 is a plan view of one of sidewalls 1110a through 1110d (collectively indicated by reference numeral 1110) of a housing member 1100 and a plurality of light source units 1300 according to an exemplary embodiment of the present invention.

Referring to FIGS. 1 through 5, a display system includes a liquid crystal display panel 100, which displays images, an image controller 200 controlling the operation of the liquid crystal display panel 100, a backlight assembly 1000 providing light to the liquid crystal display panel 100, an infrared detector 2000 sensing the motion of an object (or a user) outside the liquid crystal display panel 100 by using infrared light, and a computing unit 3000 controlling the operation of the infrared detector 2000 and controlling the image controller 200 based on an output of the infrared detector 2000.

The liquid crystal display panel 100 displays a corresponding image in response to an image signal received from the image controller 200. The backlight assembly 1000 provides light to the liquid crystal display panel 100 so that an image can be displayed on the liquid crystal display panel 100. The infrared detector 2000 projects infrared light in a direction from an inner side of the liquid crystal display panel 100 toward an outer side thereof. The infrared detector 2000 senses an infrared light reflected by an object, and generates a sensing signal. Then, the generated sensing signal is provided to the computing unit 3000.

The computing unit 3000 generates a control signal in response to the sensing signal and provides the generated control signal to the image controller 200. The image controller 200 provides an image signal, based on the received control signal, to the liquid crystal display panel 100 so that an image, based on the result of sensing the infrared light, can be displayed on the liquid crystal display panel 100.

Referring to FIG. 1, when an object 10 is located in a front region of the liquid crystal display panel 100 (that is, located at a position A), the infrared detector 2000 generates a sensing signal, corresponding to the object 10, in real time by sensing infrared light reflected by the object 10 and provides the generated sensing signal to the computing unit 3000. The front region of the liquid crystal display panel 100 refers to a region above (in front of) the liquid crystal display panel 100 and a top surface thereof. That is, the infrared detector 2000 can sense not only objects located on the top surface of the liquid crystal display panel 100 but also objects located in front of the top surface of the liquid crystal display panel 100.

In an exemplary embodiment, the sensing signal may be an image data signal. The computing unit 3000 processes image data to identify, for example, the shape, outline, color, or current coordinates of the object 10 and generates a control signal accordingly. The control signal corresponding to the shape, outline, color and current coordinates of the object 10 is provided to the image controller 200. Then, the image controller 200 provides an image signal, based on the control signal, to the liquid crystal display panel 100. Accordingly, an object image corresponding to the object 10 (that is, an image located at the same position (coordinates) as the object 10 and having a similar shape and color to those of the object 10) is displayed on the liquid crystal display panel 100.

Referring to FIG. 1, if the object 10 is moved from the location A to a location B, the infrared detector 2000 generates a sensing signal, corresponding to the motion of the object 10, in real time by sensing infrared light reflected by the object 10, and provides the generated sensing signal to the computing unit 3000. Then, the computing unit 3000 processes image data to identify new coordinates of the object 10 and generates a control signal accordingly. That is, the computing unit 3000 provides the control signal, corresponding to the shape, color and new coordinates of the object 10, to the image controller 200. Accordingly, the image controller 200 provides an image signal, based on the control signal, to the liquid crystal display panel 100. As such, the motion of the object image is presented on the liquid crystal display panel 100.

Since the infrared detector 2000 senses the motion of the object 10 in real time, a control signal containing data (new coordinates of the object 10), corresponding to the motion of the object 10, is also generated in real time. Accordingly, the image controller 200 provides an image signal, based on the generated control signal, to the liquid crystal display panel 100 in real time. Therefore, the object image displayed on the liquid crystal display panel 100 and the real object 10 move in the same manner.

In an exemplary embodiment, the computing unit 3000 processes shape, color and coordinate information of a sensed object. In an exemplary embodiment, the computing unit 3000 may process information having various data values depending on modules programmed therein. For example, the size of an image displayed on a screen may vary according to the motion of an object. For example, an image different from the object may be displayed on the screen.

Referring to FIGS. 2 through 3, the liquid crystal display panel 100 includes an upper substrate 110 having color filters and common electrodes and a lower substrate 120 having thin-film transistors (TFTs) and pixel electrodes. A liquid crystal layer is interposed between the upper substrate 110 and the lower substrate 120.

A light-shielding pattern and red (R), green (G) and blue (B) filters are formed on the upper substrate 110. The R, G and B filters are color pixels expressing predetermined colors as light passes therethrough. Common electrodes, comprising a transparent conductor such as indium tin oxide (ITO) or indium zinc oxide (IZO), are disposed on the light-shielding pattern and the color filters. In an exemplary embodiment, the light-shielding pattern and the color filters may be formed on the lower substrate 120.

The lower substrate 120 includes a plurality of pixel electrodes, arranged in a matrix, and the TFTs connected to the pixel electrodes, respectively. A source terminal of a TFT is connected to a data line, and a gate terminal of the TFT is connected to a gate line. When a turn-on voltage is applied to a gate line, TFTs connected to the gate line are turned on. If an image signal is transmitted to the turned-on TFTs via a data line, pixel electrodes connected to the turned-on TFTs are charged. Thus, an electric field is formed between the pixel electrodes of the lower substrate 120 and the common electrodes of the upper substrate 110. The electric field changes the arrangement of liquid crystals interposed between the upper substrate 110 and the lower substrate 120. As the arrangement of the liquid crystals changes, light transmittance is also changed. As such, an image can be displayed.

In an exemplary embodiment, a polarizing sheet may be attached to a top surface of the upper substrate 110 and a bottom surface of the lower substrate 120. The polarizing sheet may also be omitted to enhance the transmittance of infrared light (that is, the object detection capability of the infrared detector 2000).

The image controller 200 includes a control board 220 on which various elements for controlling the liquid crystal display panel 100 are mounted and a flexible printed circuit board (FPCB) 210 electrically connecting the control board 220 to the liquid crystal display panel 100. In an exemplary embodiment, the elements mounted on the control board 220 may include a voltage generator generating an internal voltage, a grayscale voltage generator generating a grayscale voltage, a data driver providing an image signal to a data line, a gate driver providing a turn-on voltage to a gate line, and a controller controlling the operations of the voltage generator, the grayscale voltage generator, the data driver and the gate driver.

A signal converter, converting an image received from an external system into a signal suitable for the liquid crystal display panel 100, may be mounted on the control board 220. The signal converter and the control board 220 may be manufactured in the form of integrated circuit (IC) chips and may be electrically connected to electrodes mounted on the control board 220. In an exemplary embodiment, the gate driver and the data driver may be mounted on the lower substrate 120 of the liquid crystal display panel 100. In an exemplary embodiment, the gate driver may be directly integrated on the lower substrate 120.

The backlight assembly 1000 includes the housing member 1100, an upper mold frame 1200, the light source units 1300, and a plurality of diffusion members 1400. The housing member 1100 has an open top end and has space therein. The upper mold frame 1200 is disposed on the housing member 110 and fixes the liquid crystal display panel 100. The light source units 1300 are respectively disposed adjacent to a plurality of sidewalls 1110a through 1110d (collectively indicated by reference numeral 1110) of the housing member 1100. The diffusion members 1400 are disposed on and adjacent to the respective light source units 1300.

Referring to FIGS. 2 and 3, the housing member 1100 includes the sidewalls 1110a through 1110d, a plurality of couplers 1120a through 1120d (collectively indicated by reference numeral 1120) coupling the sidewalls 1110a through 1110d to each other, and a bottom plate 1130 disposed under the sidewalls 1110a through 1110d coupled to each other by the couplers 1120a through 1120d. The housing member 1100 is shaped like a hollow, upside-down truncated quadrangular pyramid. That is, the size of an upper aperture of the housing member 1100 is greater than that of the bottom plate 1130 of the housing member 1100. Referring to FIG. 3, a cross section of the housing member 1100 is approximately shaped like an inverted triangle.

In an exemplary embodiment, the housing member 1100 has the four sidewalls 1110a through 1110d, and each of the sidewalls 1110a through 1110d is shaped like a trapezoidal plate whose upper side is longer than a lower side. The sidewalls 1110a through 1110d according to an exemplary embodiment are coupled and fixed to each other by the couplers 1120a through 1120d. In an exemplary embodiment, each of the four couplers 1120a through 1120d couples and fixes two adjacent ones of the sidewalls 1110a through 1110d to each other. Each of the couplers 1120a through 1120d is "L" shaped as shown in FIGS. 2 and 4 and has concave grooves 1121, shaped like slits, in both side surfaces thereof. The sidewalls 1110a through 1110d are inserted into and fixed to the concave grooves 1121.

When the housing member 1100 is shaped like a quadrangular pyramid having space therein, it is difficult to manufacture the sidewalls 1110a through 1110d of the housing member 1100 as a single body. That is, it is difficult and costly to manufacture a hollow quadrangular pyramid by an injection or molding process. Therefore, in an exemplary embodiment, the four sidewalls 1110a through 1110d of the housing member 1100 are manufactured as separate plates and then coupled and fixed to each other by the couplers 1120a through 1120d to form the body of the housing member 1100 shaped like a quadrangular pyramid. Since the separate sidewalls 1110a through 1110d are inserted into the concave grooves 1121 of the couplers 1120a through 1120d to couple and fix them with each other, the process of manufacturing (assembling) the body of the housing member 1100, shaped like a quadrangular pyramid, is simplified. Since the couplers 1120a through 1120d function as pillars, transformation (such as twisting (bending) or movement) of the sidewalls 1110a through 1110d can be prevented, and the strength of the housing member 1100 can be increased.

The couplers 1120a through 1120d and the sidewalls 1110a through 1110d may be coupled to each other by coupling members (not shown) such as, for example, adhesives, screws, bolts or hooks. For example, a side surface of each of the couplers 1120a through 1120d may be coupled to a surface of one of the sidewalls 1110a through 1110d by an adhesive (or an adhesive tape). In an exemplary embodiment, a plurality of sidewalls may be manufactured as a single body, and then the body may be bent. After that, portions of the bent body may be coupled to each other by couplers to form the body of a housing member shaped like a hollow quadrangular pyramid. For example, two sidewalls are manufactured as a single plate. Then, the single plate is bent to form a sidewall body which is L shaped. Two sidewalls manufactured as described above are coupled to each other by couplers to form the body of a housing member shaped like a quadrangular pyramid.

Upper ends of the sidewalls 1110a through 1110d, coupled to each other by the couplers 1120a through 1120d as described above, are coupled to the upper mold frame 1200, and lower ends of the sidewalls 1110a through 1110d are coupled to the bottom plate 1130. Thus, a first sidewall coupler 1111 is formed in an upper region of each of the sidewalls 1110a through 1110d, and a second sidewall coupler 1112 is formed in a lower region of each of the sidewalls 1110a through 1110d. Referring to FIGS. 2 and 3, the first sidewall coupler 1111 protrudes from an upper side of each of the sidewalls 1110a through 1110d and is then bent. The first sidewall coupler 1111 includes a first extension portion 1111-1, protruding from the upper side of each of the sidewalls 1110a through 1110d in a direction away from an outer surface of each of the sidewalls 1110a through 1110d, and a second extension portion 1111-2 extending downwardly from the first extension portion 1111-1. The second extension portion 1111-2 is inserted into each coupling space of the upper mold frame 1200, thereby coupling the upper mold frame 1200 to the sidewalls 1110a through 1110d.

The second sidewall coupler 1112 protrudes from a lower side of each of the sidewalls 1110a through 1110d and is then bent as shown in FIGS. 2 and 3. In an exemplary embodiment, the second sidewall coupler 1112 includes a third extension portion 1112-1, protruding from the lower side of each of the sidewalls 1110a through 1110d in the direction away from the outer surface of each of the sidewalls 1110a through 1110d, and a fourth extension portion 1112-2 extending upwardly from the third extension portion 1112-1. The fourth extension portion 1112-2 is coupled to each coupling space of the bottom plate 1130, thereby coupling the sidewalls 1110a through 1110d to the bottom plate 1130. Referring to FIG. 3, reflective plates 1140 may be attached onto the sidewalls 1110a through 1110d. When the sidewalls 1110a through 1110d are made of a material having good light reflexibility, the reflective plates 1140 may be omitted.

The bottom plate 1130 can be shaped like a square plate. The bottom plate 1130 has a bottom coupler 1131 formed in each edge region thereof and coupled to the second sidewall coupler 1112 of each of the sidewalls 1110a through 1110d. In an exemplary embodiment, the bottom coupler 1131 includes a first extension portion 1131-1 protruding from each edge of the bottom plate 1130 and is then bent upward, a second extension portion 1131-2 extending from the first extension portion in a direction toward a center region of the bottom plate 1130, and a third extension portion 1131-3 extending downwardly from the second extension portion 1131-2. The first through third extension portions 1131-1 through 1131-3 form a coupling space in each edge region of the bottom plate 1130.

In an exemplary embodiment, the bottom coupler 1131 of the bottom plate 1130 is inserted into the second sidewall coupler 1112 of each of the sidewalls 1110a through 1110d, thereby coupling the bottom plate 1130 to the sidewalls 1110a through 1110d. Referring to FIG. 3, the center region of the bottom plate 1130 is exposed to the inner space of the housing member 1100. This is because the third extension portion 1112-1 of the second sidewall coupler 1112 overlaps each edge region of the bottom plate 1130. In an exemplary embodiment, the size of an exposed area of the bottom plate 1130 may vary according to the infrared detection capability of the infrared detector 2000 coupled to the bottom plate 1130.

The upper mold frame 1200 is coupled and fixed to the upper aperture of the housing member 1100, thereby fixing the liquid crystal display panel 100. The upper mold frame 1200 includes a body 1210 shaped like a square ring, a fixing protrusion 1220 protruding from each inner side surface of the body 1210 in a direction toward the center of the body 1210, and a mold coupler 1230 formed in each edge region of the body 1210.

In an exemplary embodiment, the fixing protrusion 1220 protrudes from a lower region of each inner side surface of the body 1210 in the direction toward the center of the body 1210 shaped like a square ring. Thus, the liquid crystal display panel 100 is placed on the fixing protrusion 1220. That is, the fixing protrusion 1220 supports and fixes part of a bottom surface of the liquid crystal display panel 100. Side surfaces of the liquid crystal display panel 100 are adhered and fixed to the inner side surfaces of the body 1210. Therefore, the upper mold frame 1200 can prevent the movement of the liquid crystal display panel 100.

In an exemplary embodiment, the mold coupler 1230 is coupled to the first sidewall coupler 1111 formed in the upper region of each of the sidewalls 1110a through 1110d of the housing member 1100. The mold coupler 1230 includes a first extension portion 1231 extending downwardly from each edge region of the body 1210, a second extension portion 1232 extending from the first extension portion 1231 in the direction toward the center of the body 1210, and a third extension portion 1233 extending upward from the second extension portion 1232. The first through third extension portions 1231 through 1233 form a coupling space in each edge region of the body 1210. The first sidewall coupler 1111 of each of the sidewalls 1110a through 1110d is coupled to the coupling space, thereby coupling and fixing the upper mold frame 1200 to the housing member 1100.

Each of the light source units 1300 includes a plurality of lamp units 1310, disposed on the inner side surface of each of the sidewalls 1110a through 1110d of the housing member 1100 and arranged adjacent to each other, and one or more power supply units 1320 supplying power to the lamp units 1310.

Each of the lamp units 1310 includes a light-emitting lamp 1311 and lamp holders 1312 supporting both ends of the light-emitting lamp 1311, respectively. Each of the lamp units 1310 includes a lamp support 1313 fixing the light-emitting lamp 1311 to each of the sidewalls 1100a through 1100d.

In an exemplary embodiment, the light-emitting lamp 1311 may be a cold cathode fluorescent lamp (CCFL). Alternatively, the light-emitting lamp 1311 may be an external electrode fluorescent lamp (EEFL). The lamp holders 1312 are fixed, for example tightly fixed, to the sidewalls 1110a through 1110d. The lamp holders 1312 protect electrodes at both ends of each of the lamp units 1310 and electrically connect the electrodes to power lines penetrating the sidewalls 1110a through 1110d of the housing member 1100. The lamp support 1313 is fixed to each of the sidewalls 1110a through 1110d of the housing member 1100. The lamp support 1313 holds part of the body of the light-emitting lamp 1311, shaped like a rod, to prevent the body from moving or sinking down.

Each of the power supply units 1320 includes an inverter unit 1321 and a power line unit 1322 connecting the inverter unit 1321 to each of the lamp units 1310. The inverter unit 1321 refers to a PCB having a plurality of inverters. In an exemplary embodiment, the light-emitting lamps 1311 are disposed on the inner side surface of each of the four sidewalls 1110a through 1110d of the housing member 1100. The inverter unit 1321 is disposed on an outer side surface of each of the four sidewalls 1110a through 1110d. Thus, each of the sidewalls 1110a through 1110d may emit light independently.

The light-emitting lamps 1311 fixed to each of the sidewalls 1110a through 1110d may have the same tube current (within an acceptable error range). That is, the light-emitting lamps 1311 disposed on each of the sidewalls 1110a through 1110d of the housing member 1100 may have the same length. This is because it is difficult to turn on all of the light-emitting lamps 1311 by using one inverter if the light-emitting lamps 1311 have different tube currents. If the light-emitting lamps 1311 have different tube currents, a plurality of inverters are required for the different tube currents. Since a plurality of inverters are required, the structure of the power supply units 1320 becomes complicated. The light-emitting lamps 1311 fixed to each of the sidewalls 1110a through 1110d may have a different tube current from those fixed to the other ones of the sidewalls 1110a through 1110d. In an exemplary embodiment, the light-emitting lamps 1311 fixed to all of the sidewalls 1110a through 1110d may have the same tube current. In this case, the number of inverters required can be reduced. That is, the light-emitting lamps 1311, disposed on the inner side surfaces of the four sidewalls 1110a through 1110d, may be turned on by using one inverter.

The diffusion members 1400 are disposed above the light source units 1300. The diffusion members 1400 may be diffusion plates or diffusion sheets.

In an exemplary embodiment, the four diffusion members 1400 may uniformly diffuse light emitted from the lamp units 1310, disposed on each of the four sidewalls 1110a through 1110d, to enhance luminance uniformity and visibility of the liquid crystal display panel 100. Referring to FIG. 5, the five lamp units 1310 are disposed on each of the sidewalls 1110a through 1110d and separated from each other. If the diffusion members 1400 are not disposed above the lamp units 1310, regions where the lamp units 1310 are disposed may be brighter than regions between the lamp units 1310. If the diffusion members 1400 are disposed above the lamp units 1310, light emitted from the lamp units 1310 is diffused by the diffusion members 1400, thereby preventing the occurrence of the above brightness difference.

The diffusion members 1400 are disposed parallel to the inner side surfaces of the sidewalls 1110a through 1110d of the housing member 1100. The four diffusion members 1400 form an upside-down truncated quadrangular pyramid, inside the housing member 1100. A lower aperture of the truncated quadrangular pyramid, formed by the diffusion members 1400, exposes the center region of the bottom plate 1130 of the housing member 1100. The liquid crystal display panel 100 may be disposed in an upper aperture region of the quadrangular pyramid formed by the diffusion members 1400. An upper end of each of the diffusion members 1400 is fixed to a first fixing groove 1240 formed in each edge region of the upper mold frame 1200, and a lower end of each of the diffusion members 1400 is fixed to a second fixing groove 2210 formed in each edge region of a mounting substrate 2200 of the infrared detector 2000 in the center region of the bottom plate 1130.

The light-emitting lamps 1311 are disposed between each of the diffusion members 1400 and one of the sidewalls 1110a through 1110d. Referring to FIG. 5, the five light-emitting lamps 1311 are disposed on each of the sidewalls 1110a through 1110d. Referring to FIGS. 2 through 4, each of the diffusion members 1400 is disposed on the five light-emitting lamps 1311. The five light-emitting lamps 1311 are separated from each other, and virtual lines extending from both ends of each of the light-emitting lamps 1311 cross the upper and lower sides of each of the sidewalls 1110a through 1110d. The light-emitting lamps 1311 may be arranged at regular intervals.

The distance between upper parts of the light-emitting lamps 1311 disposed in an upper side region of each of the sidewalls 1110a through 1110d is greater than the distance between lower parts of the light-emitting lamps 1311 disposed in a lower side region of each of the sidewalls 1110a through 1110d. Accordingly, uniform luminance can be maintained within the housing member 1100.

In an exemplary embodiment, the sidewalls 1110a through 1110d of the housing member 1100 tilt at a predetermined angle with respect to the bottom surface of the liquid crystal display panel 100 disposed on the housing member 1100. While the upper side regions of the sidewalls 1110a through 1110d are disposed adjacent to the liquid crystal display panel 100, the lower side regions thereof are separated from the liquid crystal display panel 100. Accordingly, the distance between the upper parts of the light-emitting lamps 1311 in the upper side region of each of the sidewalls 1110a through 1110d may be increased to reduce the intensity of luminance provided to the liquid crystal display panel 100, and the distance between the lower parts of the light-emitting lamps 1311 in the lower side region of each of the sidewalls 1110a through 1110d may be reduced to increase the intensity of luminance provided to the liquid crystal display panel 100. As such, the intensity of luminance provided to the liquid crystal display panel 100 may be uniform.

No additional light-emitting lamps are formed on the bottom plate 1130 of the housing member 1100. Therefore, the bottom plate 1130 is dark since the center region of the bottom plate 1130 is exposed by the diffusion members 1400. The dark portion can be removed by increasing the intensity of luminance of the lower side region of each of the sidewalls 1110a through 1110d. That is, the density of the light-emitting lamps 1311 (that is, light sources) per unit area is increased as the distance from the lower side region of each of the sidewalls 1110a through 1110d is reduced.

In an exemplary embodiment, various optical members other than the diffusion members 1400 may be installed. For example, luminance-enhancing sheets or polarizing sheets may be disposed on or under the respective diffusion members 1400.

In an exemplary embodiment, the infrared detector 2000 is disposed in the center region of the bottom plate 1130 of the housing member 1100.

The infrared detector 2000 includes a plurality of infrared light sources 2100, the mounting substrate 2200 on which the infrared light sources 2100 are mounted, and an infrared camera 2300 disposed in a center region of the mounting substrate 2200. The infrared camera 2300 is mounted on the mounting substrate 2200, and the mounted infrared camera 2300 is electrically connected to the computing unit 3000 by the mounting substrate 2200.

Referring to FIG. 3, the infrared camera 2300 may be disposed in the center region of the mounting substrate 2200 disposed in the center of the bottom plate 1130. The infrared camera 2300 includes an image sensor mounted on the mounting substrate 2200 and an optical lens disposed on the image sensor. The image sensor may be a charge-coupled device (CCD), a complementary metal oxide semiconductor (CMOS), or a contact image sensor (CIS).

Since the infrared camera 2300 is disposed in the center region of the housing member 1100, the infrared camera 2300 may photograph the front region of the liquid crystal display panel 100 (that is, the top surface of the upper substrate 110 or a region in front of the upper substrate 110). Referring to FIG. 2, the infrared light sources 2100 may be disposed around the infrared camera 2300. Thus, infrared light from the infrared light sources 2100 can be uniformly projected to the front region of the liquid crystal display panel 100. In an exemplary embodiment, the eight infrared light sources 2100 are mounted on the mounting substrate 2200. The number of infrared light sources mounted on the mounting substrate 2200 is not limited to the above example and may vary. The infrared light sources 2100 may be infrared light-emitting diodes.

The second fixing groove 2210 may be formed in each edge region of the mounting substrate 2200 outside the infrared light sources 2100, and each of the diffusion members 1400 may be inserted into the second fixing groove 2210. In an exemplary embodiment, the infrared light sources 2100 and the infrared camera 2300 are exposed by a lower aperture region of the quadrangular pyramid formed by the diffusion members 1400. Therefore, infrared light emitted from the infrared light sources 2100 may proceed out of the liquid crystal display panel 100 (out of the housing member 1100) without being affected by the diffusion members 1400. Infrared light, reflected by an object outside the liquid crystal display panel 100, may proceed into the liquid crystal display panel 100 (into the housing member 1100) and may be input to the infrared camera 2300 without being affected by the diffusion members 1400. As such, the object detection capability of the infrared camera 2300 can be enhanced.

In an exemplary embodiment, the light source units 1300 and the diffusion members 1400 are disposed adjacent to the sidewalls 1110a through 1110d of the housing member 1100, to enhance luminance uniformity and visibility of the liquid crystal display panel 100. The diffusion members 1400 are fixed to the mounting substrate 2200 of the infrared detector 2000, attached onto the bottom plate 1130, to prevent a region of the mounting substrate 2200 from being covered by the diffusion members 1400. In the region of the mounting substrate 2200 not covered by the diffusion members 1400, the infrared light sources 2100 and the infrared camera 2300 are positioned to enhance the object detection capability of the infrared detector 2000. However, the present invention is not limited thereto, and the diffusion members 1400 may be fixed by a predetermined support protrusion.

Figure 6:
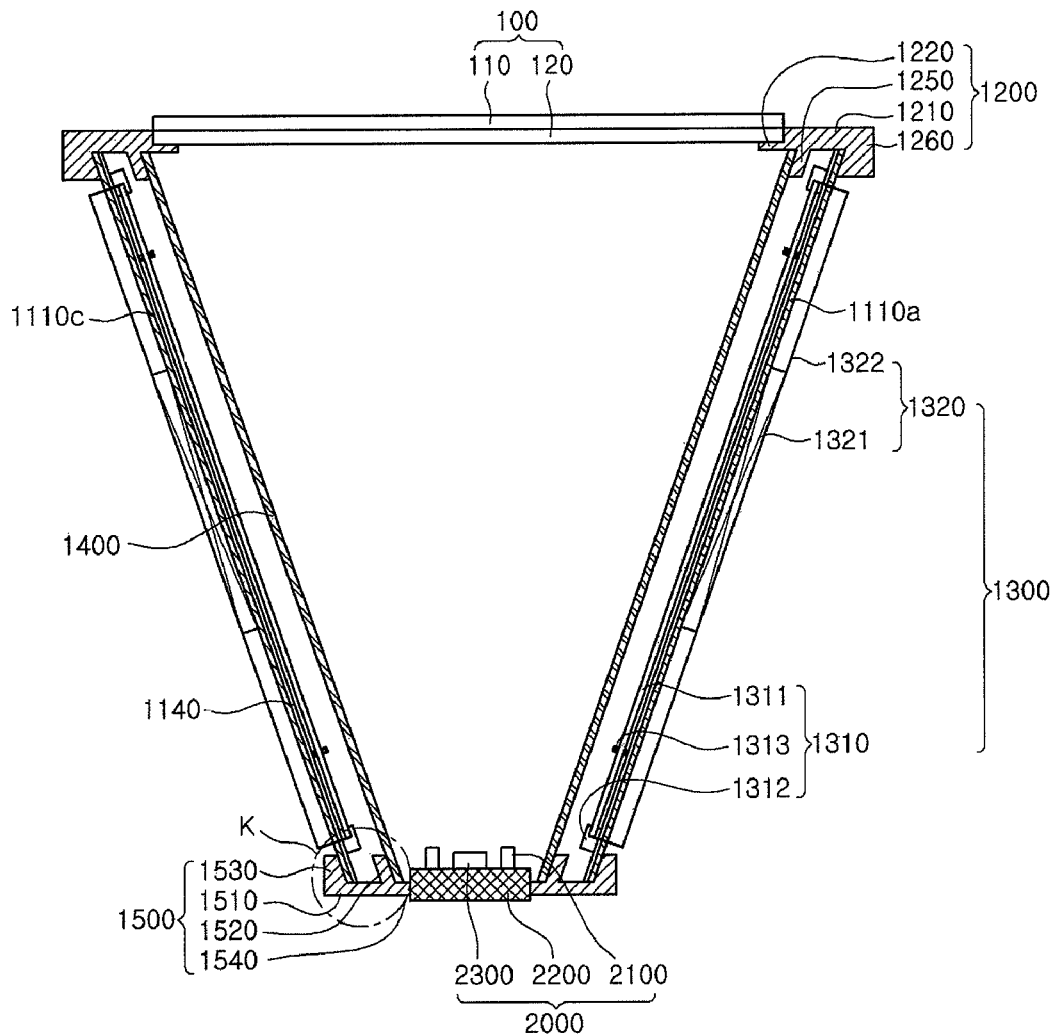
FIG. 6 is a vertical cross-sectional view of a display system according to an exemplary embodiment of the present invention.
Figure 7:
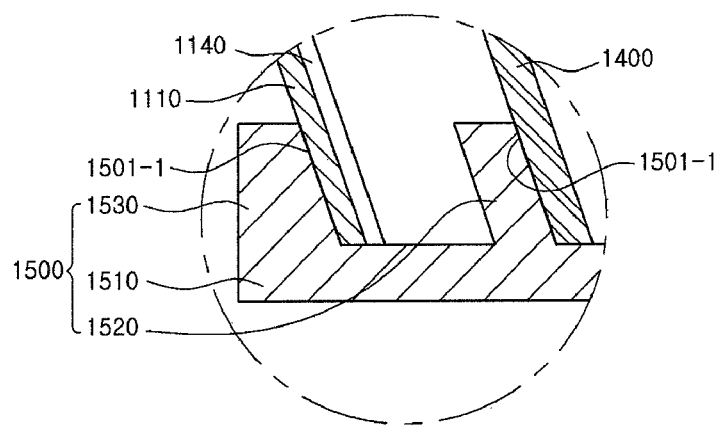
FIG. 7 is an enlarged view of a region K of FIG. 6 according to an exemplary embodiment of the present invention.
Figure 8:
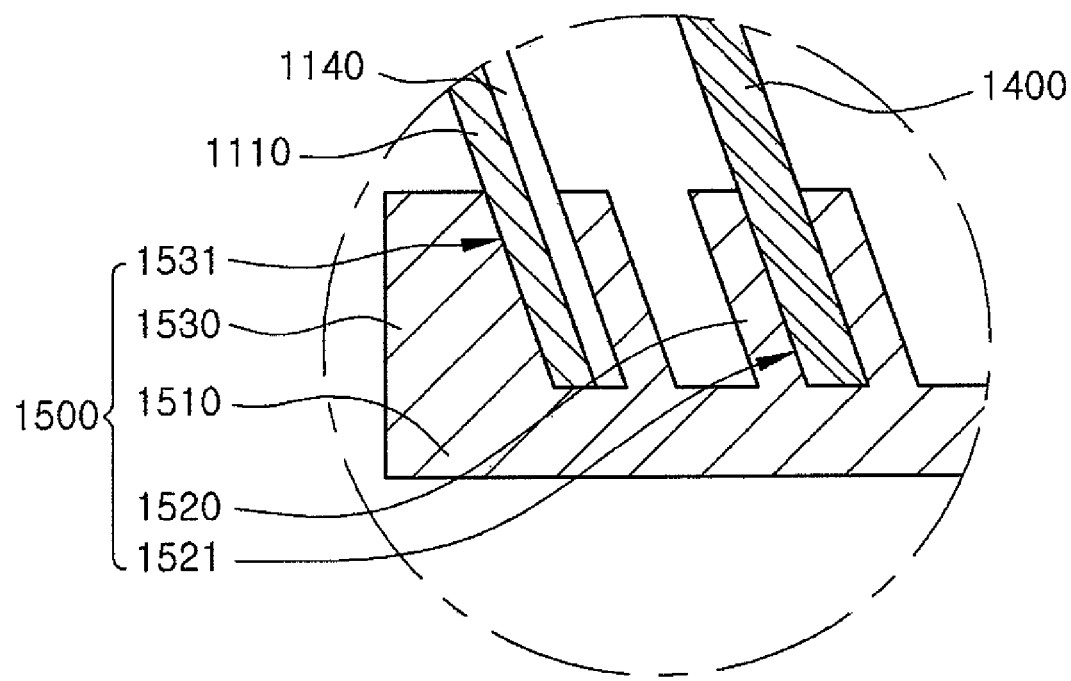
FIGS. 8 and 9 are enlarged views of the region K of FIG. 6 according to exemplary embodiments of the present invention.
Figure 9:
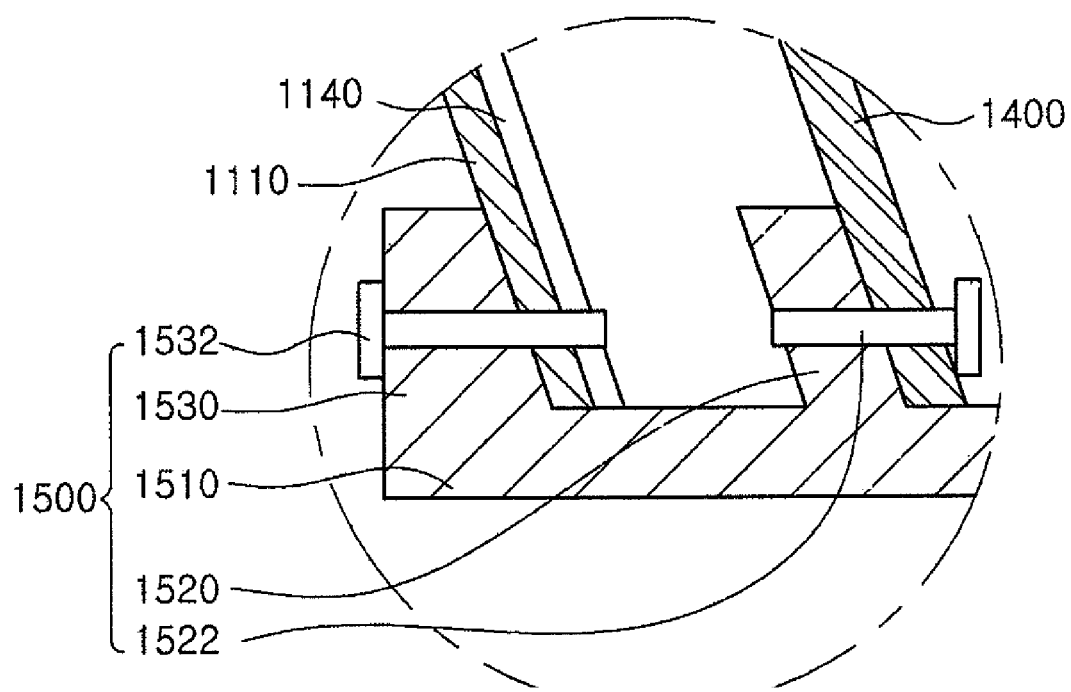

FIG. 6 is a vertical cross-sectional view of the display system according to an exemplary embodiment of the present invention. FIG. 7 is an enlarged view of a region K of FIG. 6 according to an exemplary embodiment of the present invention. FIGS. 8 and 9 are enlarged views of the region K of FIG. 6 according to exemplary embodiments of the present invention.

Referring to FIGS. 6 and 7, the display system according to an exemplary embodiment includes a liquid crystal display panel 100, an image controller 200, an infrared detector 2000, and a backlight assembly 1000. The backlight assembly 1000 houses or fixes the infrared detector 2000, the liquid crystal display panel 100 and the image controller 200.

The backlight assembly 1000 includes a housing member 1100, an upper mold frame 1200, a lower mold frame 1500, a plurality of diffusion members 1400, and a plurality of light source units 1300. The housing member 1100 has a plurality of sidewalls 1110a through 1110d (collectively indicated by reference numeral 1110) assembled into an upside-down truncated quadrangular pyramid. The upper mold frame 1200 is disposed on the housing member 1100 and fixes the liquid crystal display panel 100. The lower mold frame 1500 is disposed under the housing member 1100 and fixes the infrared detector 2000. The diffusion members 1400 are disposed adjacent the sidewalls 1110a through 1110d, respectively. The light source units 1300 are interposed between the diffusion members 1400 and the sidewalls 1110a through 1110d, respectively.

Referring to FIG. 6, the upper mold frame 1200 includes a first diffusion member-fixing protrusion 1250, which protrudes downward from a bottom surface of a body 1210, and a first sidewall-fixing protrusion 1260. The first sidewall-fixing protrusion 1260 protrudes from each edge region of the body 1210 and supports and fixes an upper region of each of the sidewalls 1110a through 1110d of the housing member 1100. In an exemplary embodiment, the sidewalls 1110a through 1110d may not be perpendicular or parallel to the bottom surface of the body 1210. For example, the sidewalls 1110a through 1110d may tilt at a predetermined angle with respect to the bottom surface of the body 1210. Accordingly, a surface of the first sidewall-fixing protrusion 1260 contacting each of the sidewalls 1110a through 1110d may tilt at a predetermined angle with respect to the bottom surface of the body 1210. In an exemplary embodiment, the first sidewall-fixing protrusion 1260 is attached and thus fixed to an outer side surface of the upper region of each of the sidewalls 1110a through 1110d by an adhesive.

The first diffusion member-fixing protrusion 1250 protrudes from a center region of the bottom surface of the body 1210. The first diffusion member-fixing protrusion 1250 supports and fixes an upper region of each of the diffusion members 1400. In an exemplary embodiment, the diffusion members 1400 are separated from the sidewalls 1110a through 1110d and disposed substantially parallel to the sidewalls 1110a through 1110d, respectively. Thus, the first diffusion member-fixing protrusion 1250 may be disposed closer to the center of the body 1210 than the first sidewall-fixing protrusion 1260. That is, the distance between the first diffusion member-fixing protrusion 1250 and the sidewall-fixing protrusion 1260 may be similar to the distance between each of the sidewalls 1110a through 1110d and each of the diffusion members 1400.

In an exemplary embodiment, the diffusion members 1400 tilt with respect to the bottom surface of the body 1210. Accordingly, the first diffusion member-fixing protrusion 1250 may also tilt with respect to the bottom surface of the body 1210. The first diffusion member-fixing protrusion 1250 and the body 1210 may be manufactured as a single body or may be manufactured separately and then coupled to each other. The first sidewall-fixing protrusion 1260 and the body 1210 may also be manufactured as a single body or may be manufactured separately and then coupled to each other.

In an exemplary embodiment, the lower mold frame 1500 is attached to lower regions of the sidewalls 1110a through 1110d of the housing member 1100 to support and fix the sidewalls 1110a through 1110d, the diffusion members 1400, and the infrared detector 2000. Referring to FIGS. 6 and 7, the lower mold frame 1500 includes a body 1510 having a concave groove 1540, a second diffusion member-fixing protrusion 1520 formed around the concave groove 1540, and a second sidewall-fixing protrusion 1530 disposed outside the second diffusion member-fixing protrusion 1520. In an exemplary embodiment, the infrared detector 2000 is mounted on a center of the concave groove 1540.

In an exemplary embodiment, a mounting substrate 2200 of the infrared detector 2000 is inserted into the concave groove 1540. In an exemplary embodiment, infrared light sources 2100 and an infrared camera 2300 of the infrared detector 2000 may be inserted into the concave groove 1540.

In an exemplary embodiment, the second diffusion member-fixing protrusion 1520 is formed around (for example, outside) the concave groove 1540 to prevent the concave groove 1540 from being covered by the diffusion members 1400. Thus, infrared light emitted from the infrared light sources 2100 is not diffused by the diffusion members 1400, or infrared light reflected by an object located outside the liquid crystal display panel 100 is not diffused by the diffusion members 1400. Consequently, the detection capability of the infrared camera 2300 can be enhanced.

In an exemplary embodiment, the sidewalls 1110a through 1110d and the diffusion members 1400 tilt with respect to a top surface of the body 1510. Referring to FIGS. 6 and 7, the second diffusion member-fixing protrusion 1520 and the second sidewall-fixing protrusion 1530 may tilt with respect to the top surface of the body 1510.

In an exemplary embodiment, a surface of the second diffusion member-fixing protrusion 1530 is adhered to a surface of each of the diffusion members 1400 by an adhesive 1501-1, and a surface of the second sidewall-fixing protrusion 1530 is adhered to each of the sidewalls 1110a through 1110d by the adhesive 1501-1. Various technologies and members may be used to fix each of the diffusion members 1400 or each of the sidewalls 1110a through 1110d to the second diffusion member-fixing protrusion 1520 or the second sidewall-fixing protrusion 1530.

Referring to FIG. 8, fixing grooves 1521 and 1531 may be formed in the second diffusion member-fixing protrusion 1520 and the second sidewall-fixing protrusion 1530, respectively. Thus, the diffusion members 1400 and the sidewalls 1110a through 1110d may be inserted into the fixing grooves 1521 and 1531, respectively, thereby fixing lower regions of the diffusion members 1400 and the sidewalls 1110a through 1110d.

Referring to FIG. 9, a second diffusion member-fixing protrusion 1520 may be coupled to each of diffusion members 1400 by a fixing member 1522 such as, for example, a screw, and a second sidewall-fixing protrusion 1530 may be coupled to each of the sidewalls 1110a through 1110d by a fixing member 1532 such as, for example, a screw. In an exemplary embodiment, the second diffusion member-fixing protrusion 1520 and the second sidewall-fixing protrusion 1530 are formed in the lower mold frame 1500. Exemplary methods disclosed with reference to FIGS. 8 and 9 may also be applied to the first diffusion member-fixing protrusion 1250 and the first sidewall-fixing protrusion 1260 formed on the upper mold frame 1200. In an exemplary embodiment, the upper and lower mold frames 1200 and 1500 may be omitted.

Figure 10:
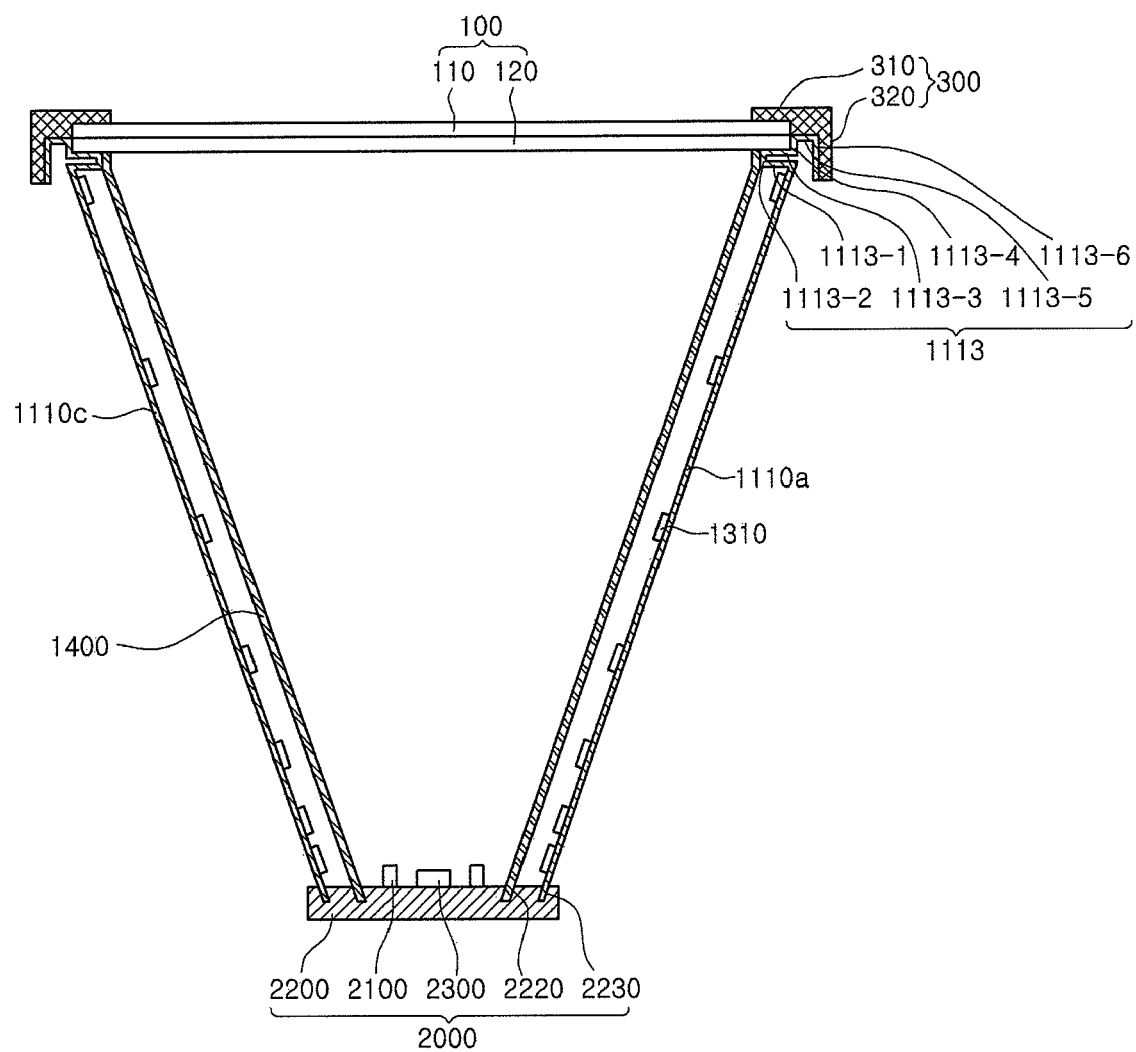
FIG. 10 is a vertical cross-sectional view of a display system according to an exemplary embodiment of the present invention.
Figure 11:
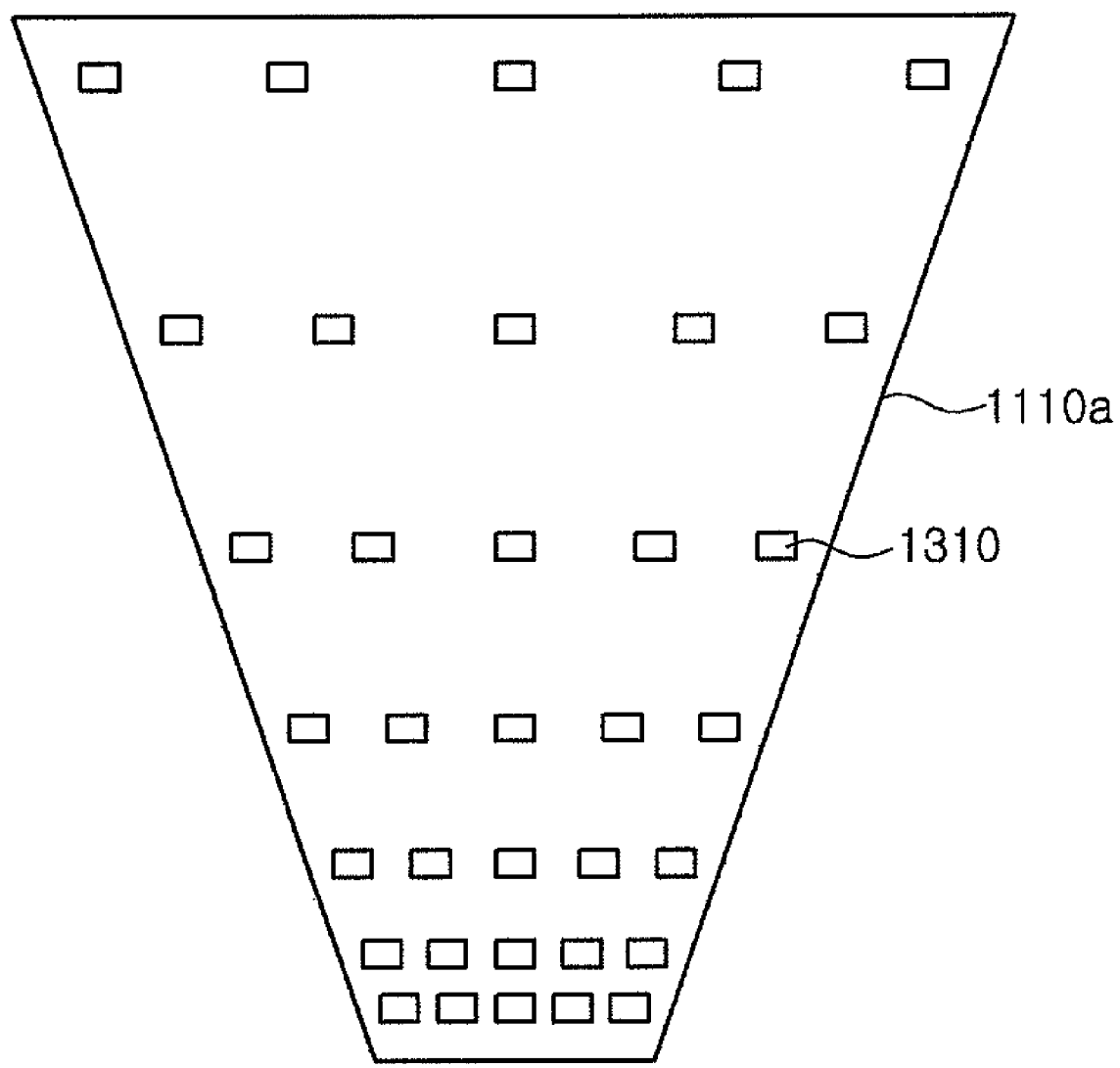
FIG. 11 is a plan view of one of sidewalls of a housing member according to an exemplary embodiment of the present invention.
Figure 12:
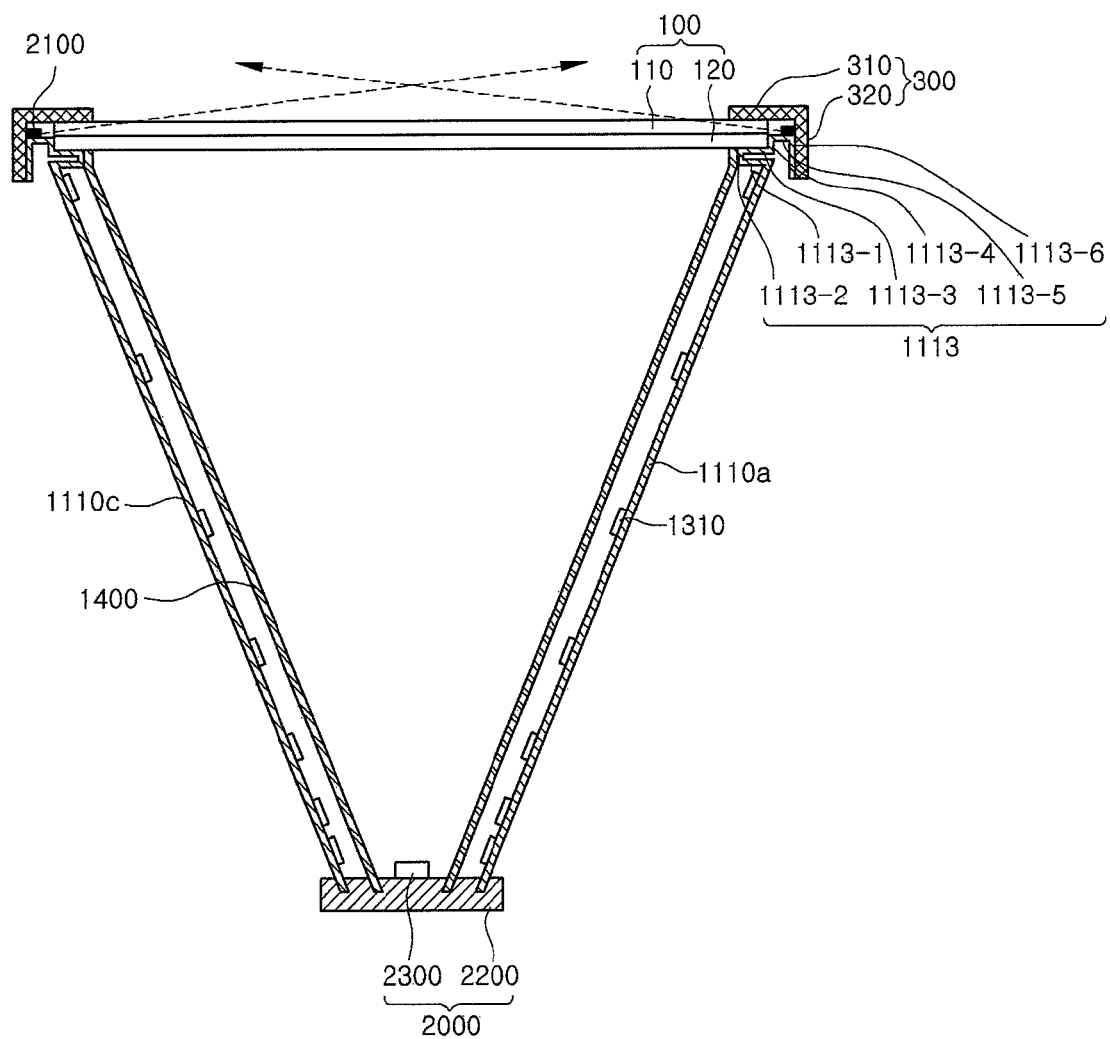
FIG. 12 is a vertical cross-sectional view of a display system according to an exemplary embodiment of the present invention.

FIG. 10 is a vertical cross-sectional view of a display system according to an exemplary embodiment of the present invention. FIG. 11 is a plan view of one of sidewalls 1110a through 1110d of a housing member 1100 and a plurality of light source units 1300 according to an exemplary embodiment of the present invention. FIG. 12 is a vertical cross-sectional view of a display system according to an exemplary embodiment of the present invention.

Referring to FIGS. 10 and 11, the display system includes a backlight assembly 1000, a liquid crystal display panel 100, disposed on the backlight assembly 1000, a cover unit 300 covering an upper region of the liquid crystal display panel 100, and an infrared detector 2000 installed in the backlight assembly 1000.

The backlight assembly 1000 includes the housing member 1100, a plurality of diffusion members 1400, and the light source units 1300. The housing member 1100 has the sidewalls 1110a through 1110d (collectively indicated by reference numeral 1110) assembled into an upside-down truncated quadrangular pyramid. The diffusion members 1400 are disposed adjacent the sidewalls 1110a through 1110d, respectively. The light source units 1300 are interposed between the diffusion members 1400 and the sidewalls 1110a through 1110d, respectively.

In an exemplary embodiment, each of the sidewalls 1110a through 1110d of the housing member 1100 includes a panel support 1113 in an upper region thereof. The panel support 1113 supports each edge region of a bottom surface of the liquid crystal display panel 100. The panel support 1113 may be formed by bending a portion of the upper region of each of the sidewalls 1110a through 1110d. Referring to FIG. 10, the panel support 1113 includes a first horizontal extension portion 1113-1 protruding from an upper end of each of the sidewalls 1110a through 1110d in a direction toward the center of the housing member 1100, a first vertical extension portion 1113-2 extending upward from the first horizontal extension portion 1113-1, a second horizontal extension portion 1113-3 extending from the first vertical extension portion 1113-2 in a direction away from the center of the housing member 1100, a second vertical extension portion 1113-4 extending upward from the second horizontal extension portion 1113-3, a third horizontal extension portion 1113-5 extending from the second vertical extension portion 1113-4 in the direction away from the center of the housing member 1100, and a third vertical extension portion 1113-6 extending downward from the third horizontal extension portion 1113-5.

In an exemplary embodiment, the bottom surface of the liquid crystal display panel 100 is attached, for example, tightly to the second horizontal extension portion 1113-3, and a side surface of the liquid crystal display panel 100 is attached, for example, tightly to the second vertical extension portion 1113-4. Since the panel support 1113 supports and fixes the liquid crystal display panel 100 by using a horizontal extension portion and a vertical extension portion, no additional mold frame is required to support the liquid crystal display panel 100.

In an exemplary embodiment, an upper region of each of the diffusion members 1400 may be fixed to the panel support 1113. Referring to FIG. 10, the first vertical extension portion 1113-2 is attached to the upper region of each of the diffusion members 1400, thereby fixing the upper region of each of the diffusion members 1400.

In an exemplary embodiment, light-emitting diodes may be used as lamp units 1310 of each of the light source units 1300 interposed between the diffusion members 1400 and the sidewalls 1110a through 1110d, respectively. Referring to FIG. 11, a plurality of light-emitting diodes may be mounted on each of the sidewalls 1110a through 1110d. In an exemplary embodiment, a plurality of light-emitting diodes having the same intensity of luminance are mounted on each of the sidewalls 1110a through 1110d. Equal power may be supplied to the light-emitting diodes via an inverter. The number of light-emitting diodes mounted on a lower region of each of the sidewalls 1110a through 1110d per unit area may be greater than that of light-emitting diodes mounted on the upper region of each of the sidewalls 1110a through 1110d per unit area. That is, the number of light-emitting diodes mounted per unit area may be increased from the upper region to the lower region of each of the sidewalls 1110a through 1110d. Therefore, light can be uniformly supplied to the liquid crystal display panel 100, and the creation of a dark portion in a bottom region (i.e., a region where the infrared detector 2000 is located) of the housing member 1100 can be prevented.

In an exemplary embodiment, the lower regions of the sidewalls 1110a through 1110d of the housing member 1100 and those of the diffusion members 1400 may be fixed by a mounting substrate 2200 of the infrared detector 2000. That is, a sidewall-fixing groove 2230 is formed in each edge region of the mounting substrate 2200, and the lower region of each of the sidewalls 1110a through 1110 is inserted into the sidewall-fixing groove 2230. A diffusion member-fixing groove 2220 is formed closer to the center of the mounting substrate 2200 than the sidewall-fixing groove 2230, and the lower region of each of the diffusion members 1400 is inserted into the diffusion member-fixing groove 2220.

In an exemplary embodiment, the sidewall-fixing groove 2230 may be separated from the diffusion member-fixing groove 2220 by a predetermined gap. The predetermined gap may be similar to an average gap between each of the diffusion members 1400 and each of the sidewalls 1110a through 1110d. Infrared light sources 2100 and an infrared camera 2300 may be disposed on the mounting substrate 2200 installed closer to the center of the mounting substrate 2200 than the diffusion member-fixing groove 2220.

In an exemplary embodiment, the cover unit 300 is installed. Referring to FIG. 10, the cover unit 300 covers an upper edge region of the liquid crystal display panel 100, and the lower edge region of the liquid crystal display panel 100 is supported by the panel support 1113 of the housing member 1100. The cover unit 300 is shaped like a square ring and includes a horizontal body 310 adhered, for example, tightly to the upper region of the liquid crystal display panel 100 and a vertical body 320 fixed, for example, tightly to the housing member 1100. The vertical body 320 of the cover unit 300 is fixed, for example, tightly to the third vertical extension portion 1113-6 of the panel support 1113. The horizontal body 310 is adhered, for example, tightly to the upper edge region of the liquid crystal display panel 100 to prevent the disengagement of the liquid crystal display panel 100.

Referring to FIG. 12, infrared light sources 2100 of an infrared detector 2000 may be disposed adjacent side surfaces of a liquid crystal display panel 100, that is, between a cover unit 300 and a housing member 1100. In an exemplary embodiment, a bottom surface of a horizontal body 310 of the cover unit 300 is separated from a panel support 1113 of the housing member 1100 by a predetermined space, and each of the infrared light sources 2100 is installed in the predetermined space. Thus, the size of the infrared detector 2000 located in a lower region of the housing member 1100 can be reduced. That is, in the lower region of the housing member 1100, only an infrared camera 2300 is disposed. Thus, the size of the lower region of the housing member 1100 (that is, the size of a region exposed by the diffusion members 1140) may be equal to that of the infrared camera 2300.

In an exemplary embodiment, since the infrared light sources 2100 emit infrared light in a direction from side surfaces of a liquid crystal display panel 100 toward a front region of the liquid crystal display panel 100, the amount of infrared light irradiated to an object located in the front region (that is, a top surface of the liquid crystal display panel 100 or a region in front of the liquid crystal display panel 100) of the liquid crystal display panel 100 can be increased. In an exemplary embodiment, the infrared light sources 2100 may be installed on a top surface of the horizontal body 310 of the cover unit 300.

In an exemplary embodiment, a plurality of infrared cameras may be installed. The infrared cameras may be mounted on a single mounting substrate to sense all regions of a liquid crystal display panel. Alternatively, a plurality of infrared cameras may be mounted on a plurality of mounting substrates, respectively. In this case, while each of the infrared cameras senses a predetermined region, the infrared cameras as a whole sense all regions of the liquid crystal display panel.

Figure 13:
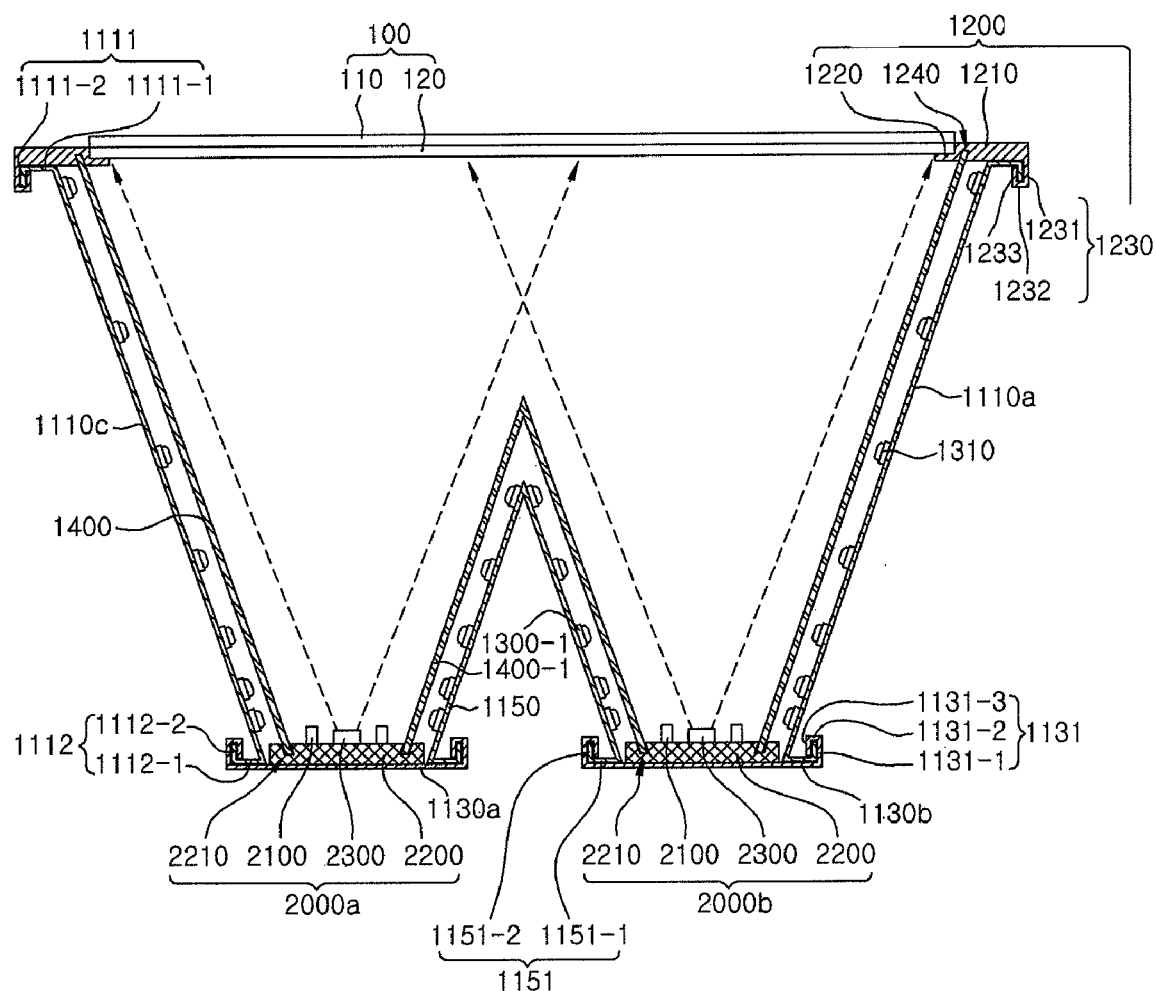
FIG. 13 is a vertical cross-sectional view of a display system according to an exemplary embodiment of the present invention.
Figure 14:
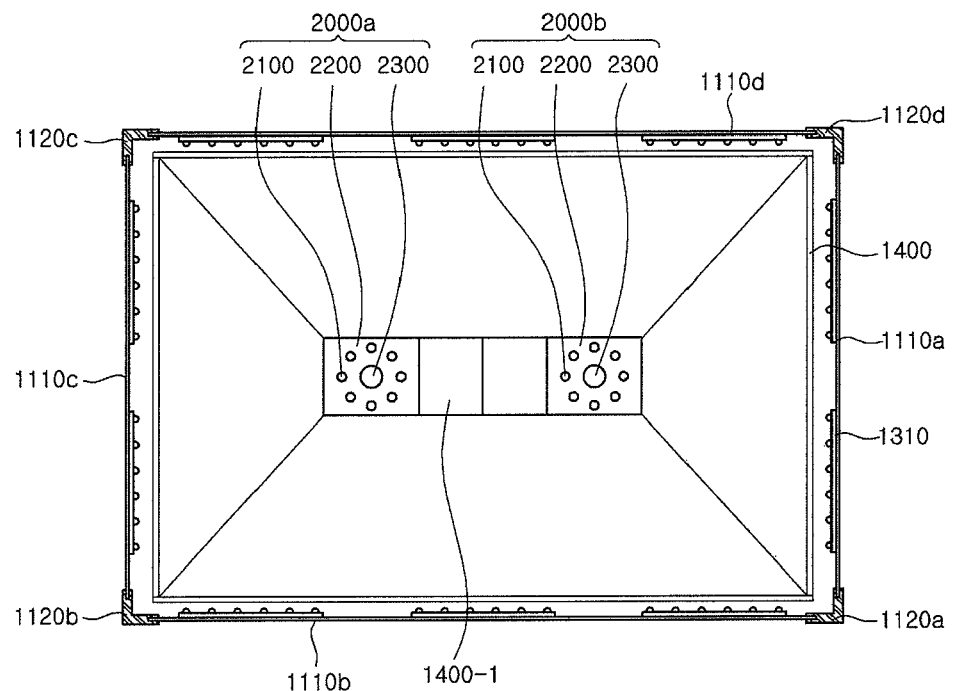
FIG. 14 is a horizontal cross-sectional view of a display system according to an exemplary embodiment of the present invention.
Figure 15:
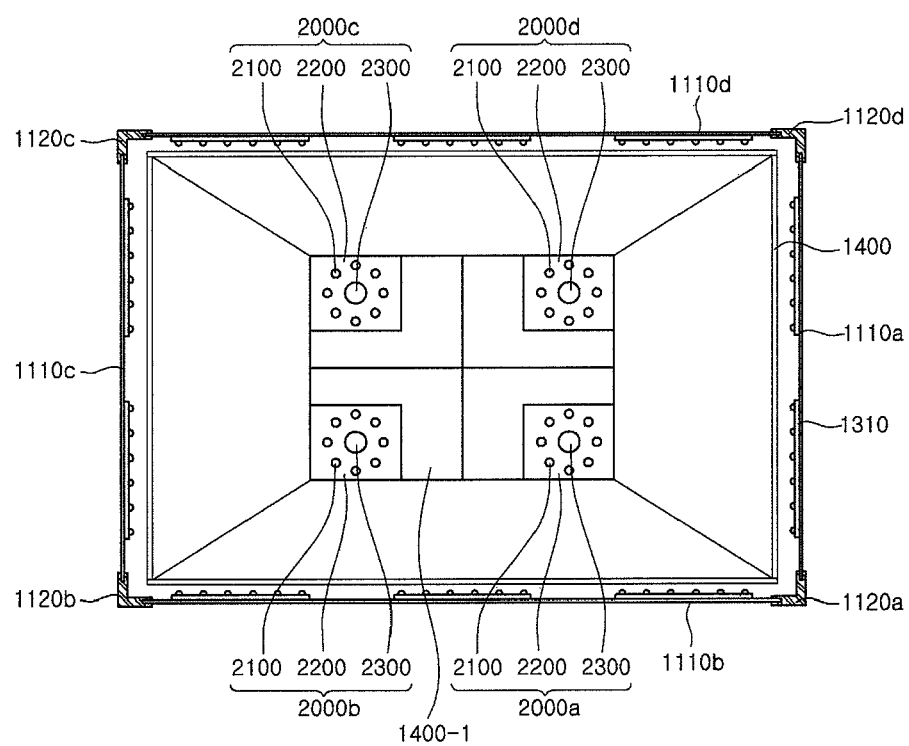
FIG. 15 is a horizontal cross-sectional view of a display system according to an exemplary embodiment of the present invention.
Figure 16:
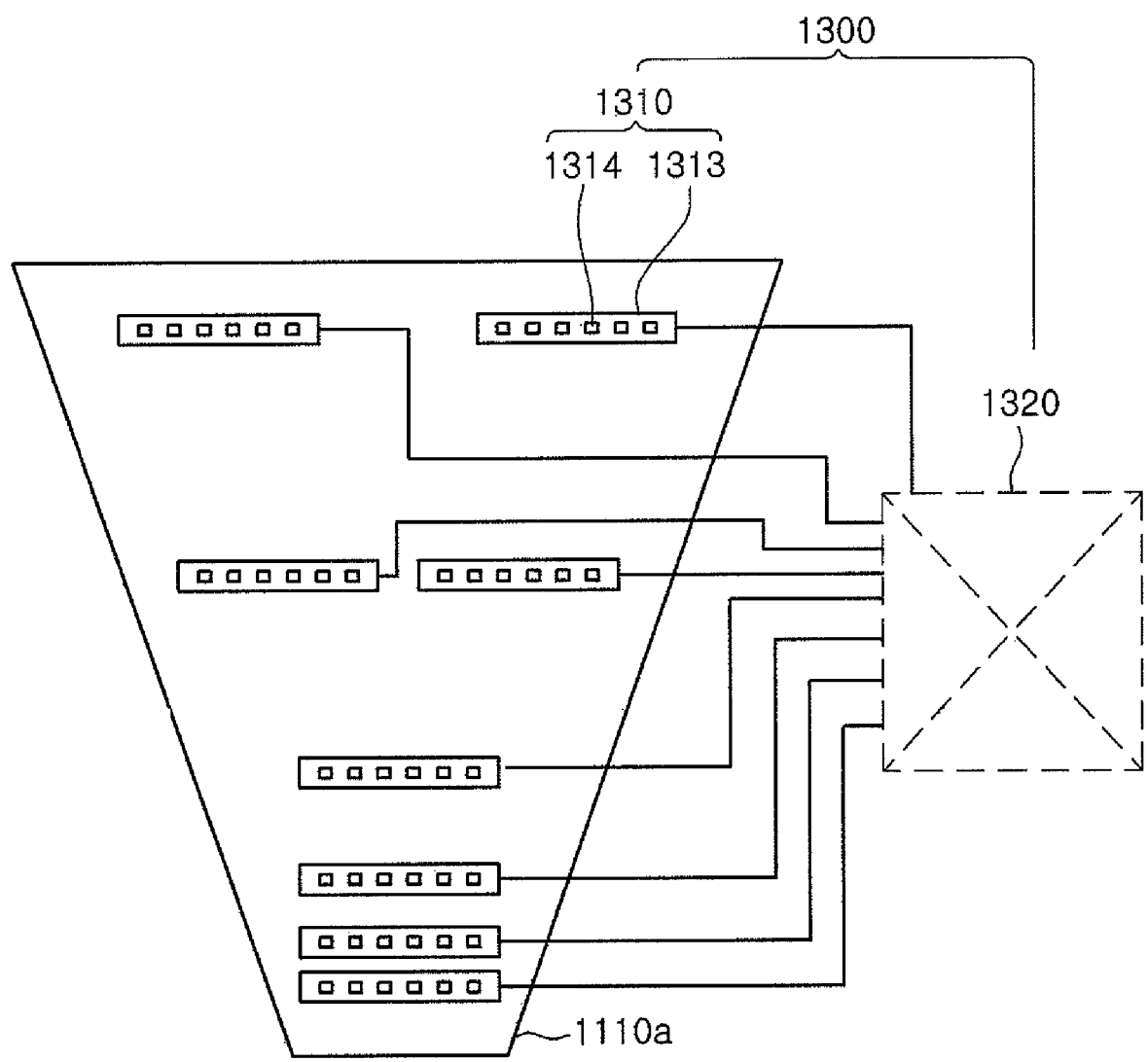
FIG. 16 is a plan view of one of sidewalls of a housing member and a plurality of light source units according to an exemplary embodiment of the present invention.

FIG. 13 is a vertical cross-sectional view of a display system according to an exemplary embodiment of the present invention. FIG. 14 is a horizontal cross-sectional view of a display system according to an exemplary embodiment of the present invention. FIG. 15 is a horizontal cross-sectional view of a display system according to an exemplary embodiment of the present invention. FIG. 16 is a plan view of one of sidewalls 1110a through 1110d of a housing member 1100 and a plurality of light source units 1300 according to an exemplary embodiment of the present invention.

Referring to FIGS. 13 through 16, the display system includes a liquid crystal display panel 100, an image controller 200, a backlight assembly 1000, and first and second infrared detectors 2000a and 2000b.

The two infrared detectors 2000a and 2000b are disposed in a lower region of the housing member 1100 of the backlight assembly 1000. Elements of each of the first and second infrared detectors 2000a and 2000b are identical to those of the infrared detector 2000 described above. In an exemplary embodiment, an infrared camera 2300 of the first infrared detector 2000a detects infrared light, reflected by an object, in a region of the liquid crystal display panel 100, and an infrared camera 2300 of the second infrared detector 2000b detects infrared light in the other regions.

Referring to FIG. 13, detection regions of the two infrared cameras 2300 may overlap in a center region of the liquid crystal display panel 100. That is, in previous embodiments, a single infrared camera photographs the entire region of a liquid crystal display panel. In an exemplary embodiment, the entire region of the liquid crystal display panel 100 is photographed by the two infrared cameras 2300. When one infrared camera is used, it is difficult to reduce the height of a housing member due to an angle of view of the infrared camera which remains unchanged. However, when the two infrared cameras 2300 are used as in the present embodiment, since each of the infrared cameras 2300 photographs a predetermined region of the liquid crystal display panel 100, the height of the housing member 1100 (that is, the distance between the liquid crystal display panel 100 and a bottom surface of the housing member 1100) can be reduced.

The first and second infrared detectors 2000a and 2000b may have respective mounting substrates 2200. The first and second infrared detectors 2000a and 2000b may also share a single mounting substrate. When the first and second detectors 2000a and 2000b share a single mounting substrate, the two infrared cameras 2300 are separated from each other by a predetermined gap. The predetermined gap between the two infrared cameras 2300 may appear to be a dark portion when viewed from outside the liquid crystal display panel 100.

The housing member 1100, which has the first and second infrared detectors 2000a and 2000b mounted on a bottom surface thereof, includes a partition wall 1150 between the first and second infrared detectors 2000a and 2000b (that is, between the two infrared cameras 2300), an inner diffusion member 1400-1 separated from the partition wall 1150, and an inner light source unit 1300-1 interposed between the partition wall 1150 and the inner diffusion member 1400-1. If the inner light source unit 1300-1 is installed between the two infrared cameras 2300, the above dark portion can be prevented. Referring to FIG. 13, a cross section of each of the partition wall 1150 and the inner diffusion member 1400-1 may be shaped like an upside-down 'V'.

The housing member 1100 includes first and second bottom plates 1130a and 1130b connecting the sidewalls 1110a through 1110d to the partition wall 1150. Referring to FIGS. 13 and 14, the first and second infrared detectors 2000a and 200b are disposed on the first and second bottom plates 1130a and 1130b, respectively. Three surfaces of each of the first and second bottom plates 1130a and 1130b are coupled and thus fixed to the sidewalls 1110a through 1110d, and the remaining one surface of each of the first and second bottom plates 1130a and 1130b is coupled and fixed to the partition wall 1150. Partition wall couplers 1150 are formed at both ends of the partition wall 1150. Each of the partition wall couplers 1150 is coupled and fixed to a bottom coupler 1131 of each of the first and second bottom plates 1130a and 1130b. Thus, a cross section of the housing member 1100 according to an exemplary embodiment is shaped like 'W'.

In an exemplary embodiment, the two infrared detectors 2000a and 2000b are installed. Referring to FIG. 15, four infrared detectors 2000a through 2000d may be installed in a lower region of a housing member 1100, that is, on a bottom surface of the housing member 1100. Accordingly, the region of a liquid crystal display panel 100 is partitioned into four regions, and infrared light received through the four regions is detected by the four infrared detectors 2000a through 2000d, respectively. Consequently, the infrared detection capability of a display system can be enhanced.

A field of view secured by each of infrared cameras 2300 is reduced. Thus, a gap between each of the infrared cameras 2300 and the liquid crystal display panel 100 can be reduced, which, in turn, reduces the size (for example, height) of the housing member 1100. Partition walls, inner diffusion members 1400-1, and inner light source units 1300-1, interposed between the partition walls and the inner diffusion members 1400-1, respectively, are installed between the four infrared detectors 2000a through 2000d. In an exemplary embodiment, the number of infrared detectors may be more or less than four.

Each of the light source units 1300 and the inner light source units 1300-1 includes a plurality of lamp units 1310 and one or more power supply units 1320. Referring to FIG. 16, the lamp units 1310 are disposed on each of the sidewalls 1110a through 1110d and receive the same voltage from one power supply unit 1320 to emit light. Each of the lamp units 1310 includes, for example, a bar-type substrate 1313 and a plurality of light-emitting diodes 1314 mounted on the substrate 1313.

For example, a plurality of infrared cameras may be disposed between diffusion members and a liquid crystal display panel, thereby producing a slimmer display system. In an exemplary embodiment, since the liquid crystal display panel has transmissive characteristics, the infrared cameras may not be disposed directly under the liquid crystal display panel. The infrared cameras may be installed diagonally under the liquid crystal display panel to photograph an upper region (for example, a top surface) of the liquid crystal display panel.

Figure 17:
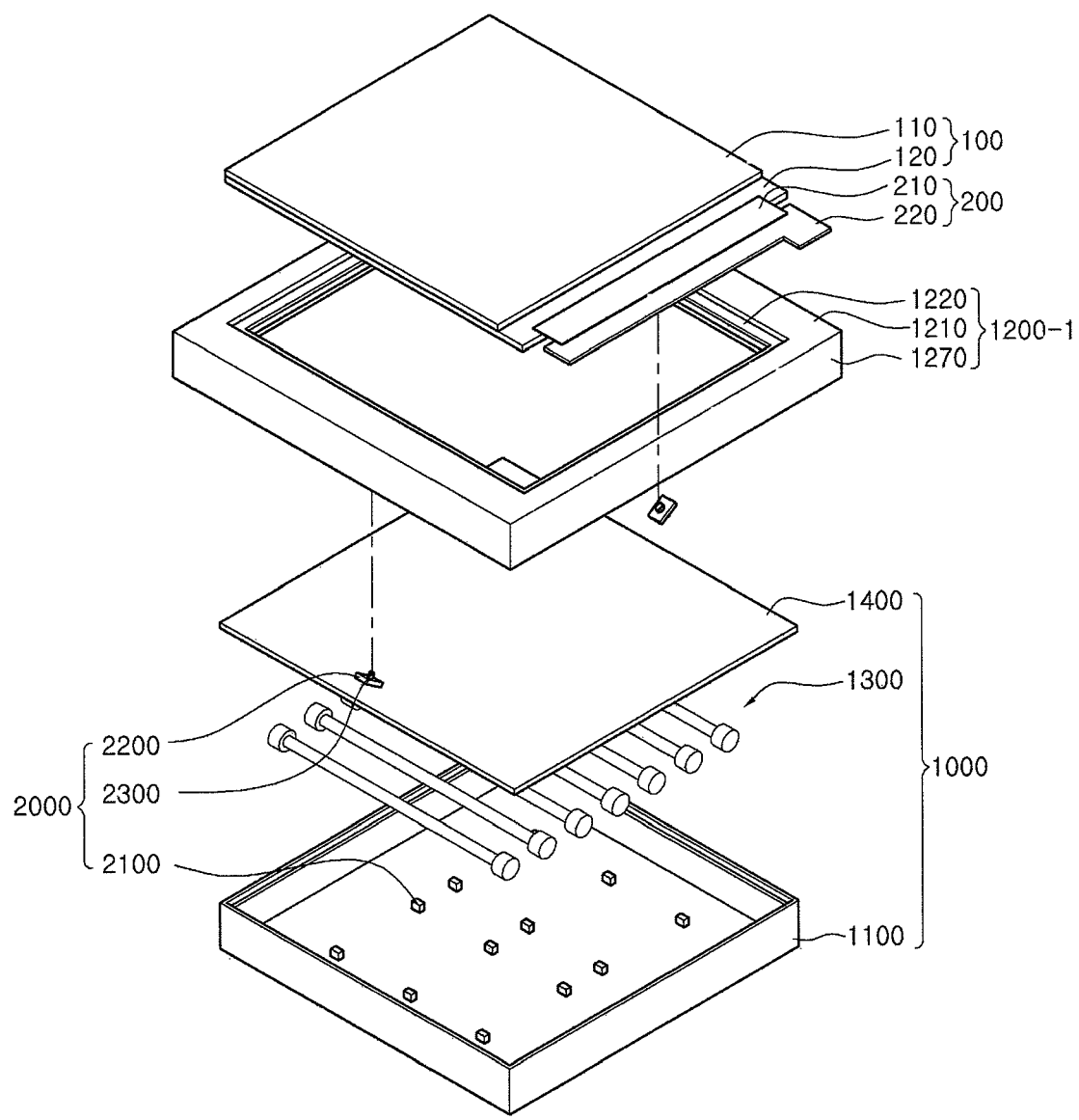
FIG. 17 is an exploded perspective view of a display system according to an exemplary embodiment of the present invention.
Figure 18:
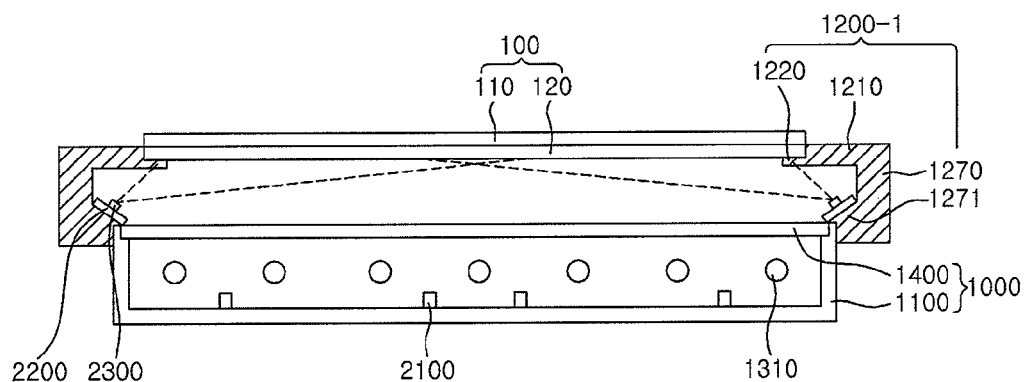
FIG. 18 is a vertical cross-sectional view of a display system according to an exemplary embodiment of the present invention.
Figure 19:
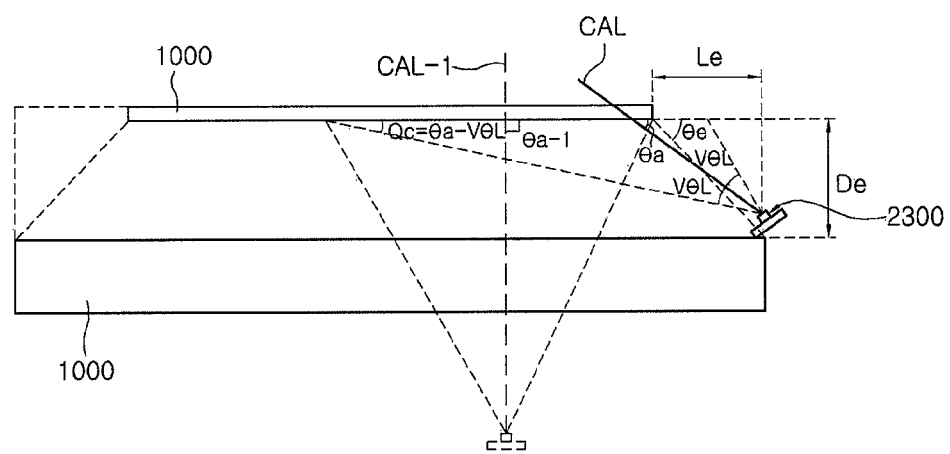
FIG. 19 is a diagram showing a method of disposing a plurality of infrared cameras according to an exemplary embodiment of the present invention.
Figure 20:
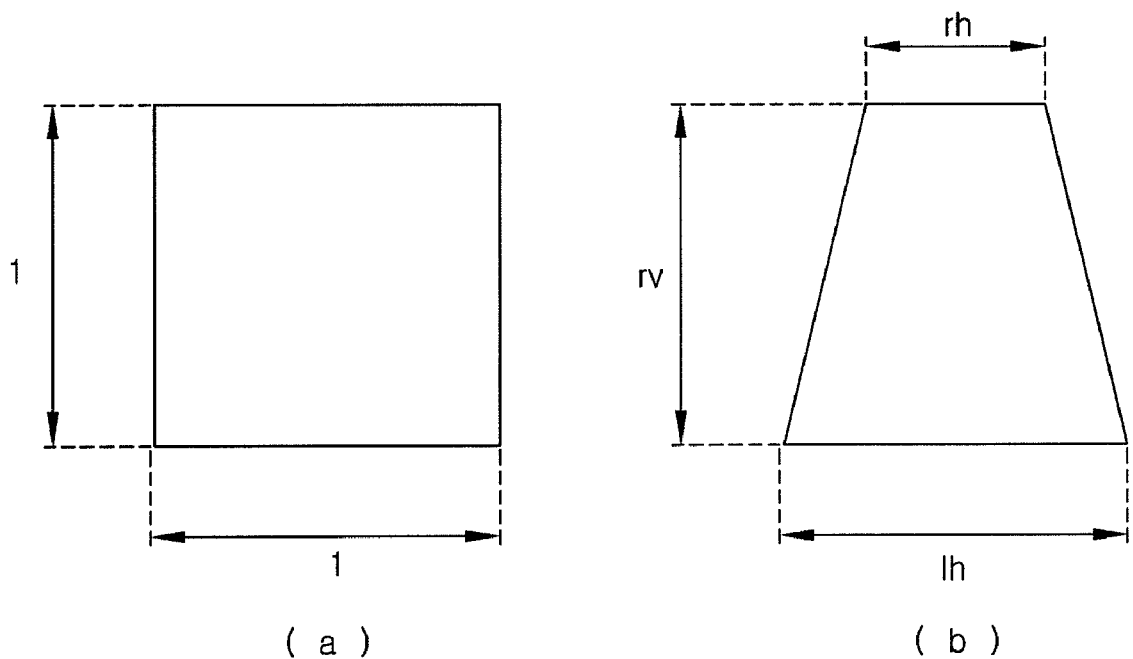
FIG. 20 is a diagram showing image distortion of a tilting infrared camera according to an exemplary embodiment of the present invention.
Figure 21:
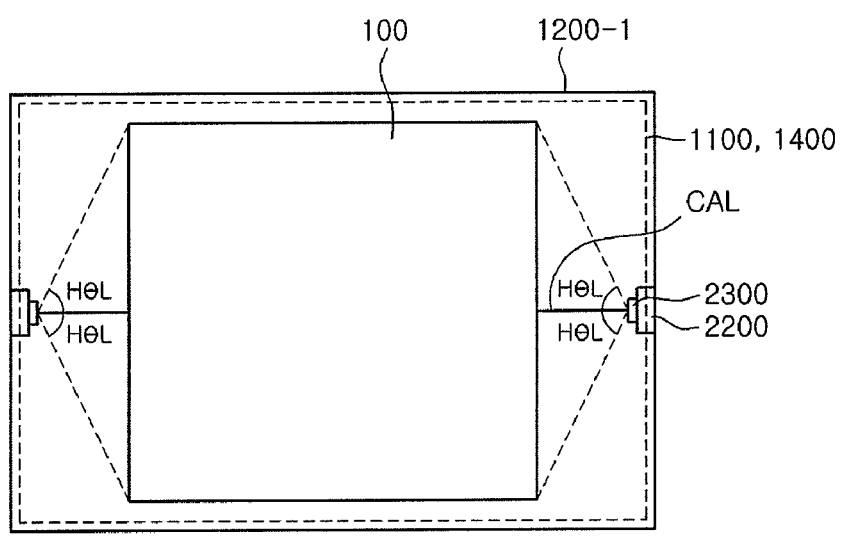
FIG. 21 is a plan view of a display system according to an exemplary embodiment of the present invention.
Figure 22:
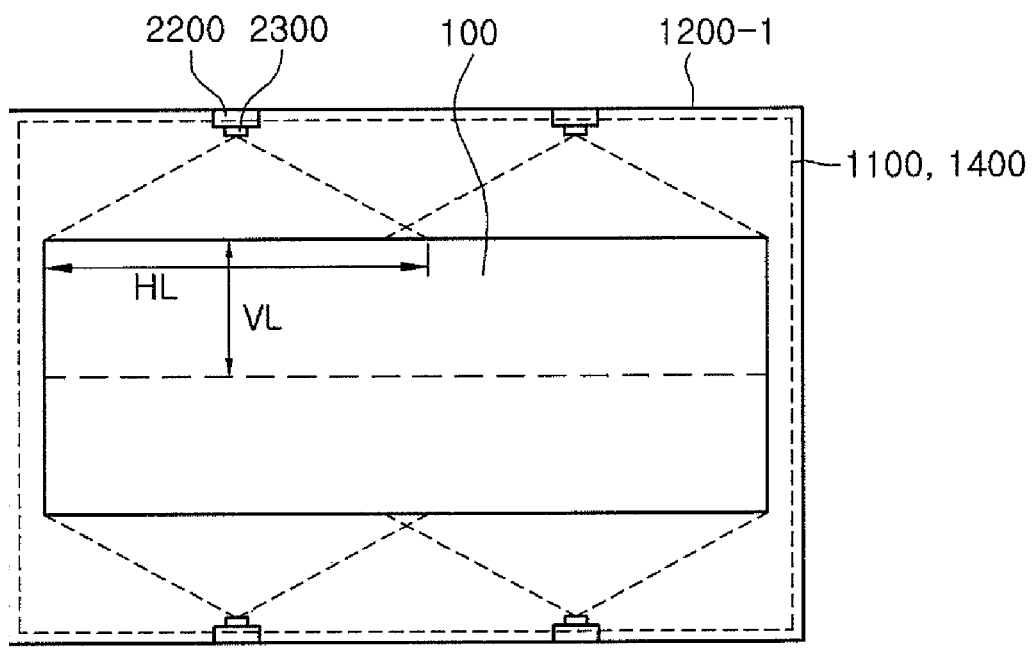
FIGS. 22 and 23 are plan views of display systems according exemplary embodiments of the present invention.
Figure 23:
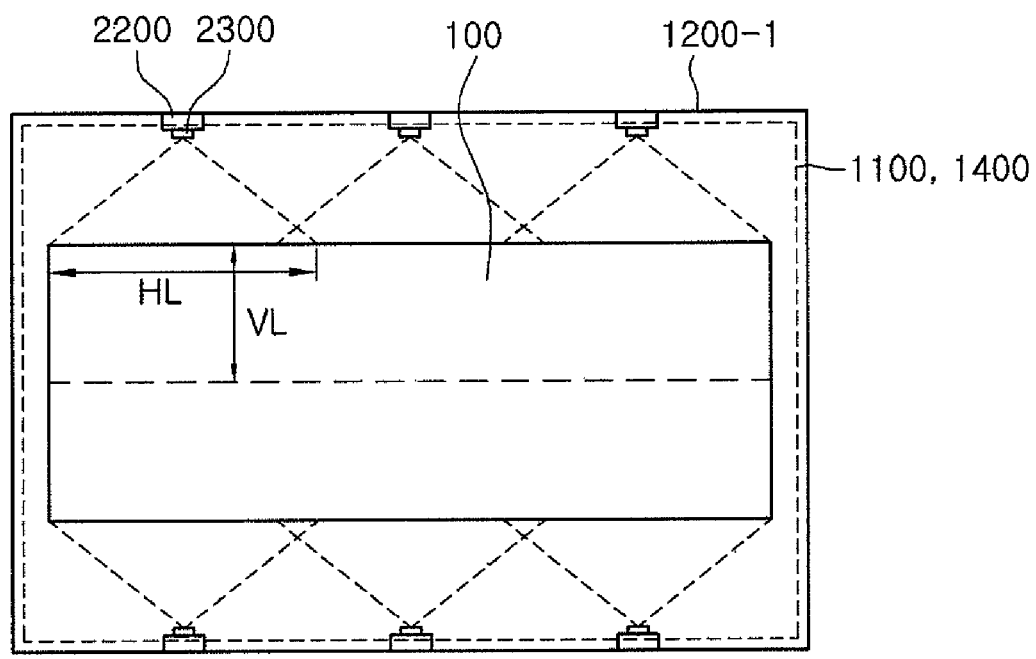

FIG. 17 is an exploded perspective view of a display system according to an exemplary embodiment of the present invention. FIG. 18 is a vertical cross-sectional view of a display system according to an exemplary embodiment of the present invention. FIG. 19 is a diagram of a method of disposing a plurality of infrared cameras 2300 according to an exemplary embodiment of the present invention. FIG. 20 is a diagram for explaining image distortion of a tilting infrared camera according to an exemplary embodiment of the present invention. FIG. 21 is a plan view of a display system according to an exemplary embodiment of the present invention. FIGS. 22 and 23 are plan views of display systems according to exemplary embodiments of the present invention.

Referring to FIGS. 17 through 21, the display system includes a liquid crystal display panel 100, a backlight assembly 1000 providing light to the liquid crystal display panel 100 and having a diffusion member 1400, and an infrared detector 2000 having the infrared cameras 2300 interposed between the liquid crystal display panel 100 and the diffusion member 1400.

Referring to FIGS. 17 and 18, the backlight assembly 1000 includes a housing member 1100 having space therein, light source units 1300 disposed in the space, the diffusion member 1140 disposed on the light source units 1300, and a mold frame 1200-1 disposed on the housing member 1100. The mold frame 1200-1 supports and fixes the liquid crystal display panel 100.

Since the infrared cameras 2300 are installed between the diffusion member 1400 and the liquid crystal display panel 100, the height of the housing member 1100 (that is, the height of sidewalls of the housing member 1100) can be lowered. That is, since the infrared cameras 2300 are disposed on the diffusion member 1400, the diffusion member 1400 may be placed parallel to a bottom surface of the liquid crystal display panel 100. Thus, the housing member 1100 according to an exemplary embodiment is shaped like a square box having an open top end. That is, the housing member 1100 has a bottom surface, which is shaped like a square plate, and sidewalls which are formed along edge regions of the bottom surface.

Referring to FIG. 18, a stepped portion may be formed at each side surface of the housing member 1100, and the diffusion member 1400, which is shaped like a plate or a sheet, may be fixed to the stepped portion. The mold frame 1200-1 according to an exemplary embodiment includes a body 1210, having a fixing protrusion 1220, and mold sidewalls 1270 extending from the body 1210. The body 1210 is shaped like, for example, a square band having two long sides and two short sides. The fixing protrusion 1220 protrudes from the body 1210 in a direction toward the center of the square band. The fixing protrusion is disposed under the liquid crystal display panel 100, and each edge region of the liquid crystal display panel 100 is supported by the fixing protrusion 1220.

Referring to FIGS. 17 and 21, short side regions of the body 1210 may be wider than long side regions thereof. This is because the infrared cameras 2300 are disposed under the short side regions of the body 1210, respectively, as shown in FIG. 21. The mold sidewalls 1270 extend downward from edges of the bottom surface of the body 1210. The mold sidewalls 1270 are coupled and fixed to the housing member 1100 thereunder. In an exemplary embodiment, a mold-fixing protrusion 1271 is formed on each of the mold sidewalls 1270. A mounting substrate 2200, on which each of the infrared cameras 2300 is mounted, is fixed to the mold-fixing protrusion 1271.

Infrared light sources 2100 of the infrared detector 2000 may be disposed inside the housing member 1100 (i.e., under the diffusion member 1400). Referring to FIGS. 17 and 18, the infrared light sources 2100 may be mounted on the bottom surface of the housing member 1100. Thus, infrared light emitted from the infrared light sources 2100 may be diffused by the diffusion member 1400 and thus uniformly provided to the entire region of the liquid crystal display panel 100 In an exemplary embodiment, the infrared light sources 2100 may be disposed on each of the mold sidewalls 1270 or the mold-fixing protrusion 1271.

The infrared cameras 2300 may be disposed diagonally under the liquid crystal display panel 100 due to light-transmitting characteristics of the liquid crystal display panel 100. That is, if the infrared cameras 2300 are disposed directly under the liquid crystal display panel 100, the infrared cameras may be reflected in a front region of the liquid crystal display panel 100. Therefore, the infrared cameras 2300 may be viewed as dark portions. In an exemplary embodiment, the infrared cameras 2300 are installed inside the mold frame 2300-1 (that is, between the body 1210 and the mold sidewalls 1270) interposed between the liquid crystal display panel 100 and the diffusion member 1400. Referring to FIGS. 17, 18 and 21, two infrared cameras 2300 are installed in the two short side regions of the mold frame 1200-1. Thus, the front region of the liquid crystal display panel 100 is photographed by the two infrared cameras 2300. In an exemplary embodiment, each of the infrared cameras 2300 may photograph approximately half of the front region of the liquid crystal display panel 100.

Since the infrared cameras 2300 are disposed diagonally under the liquid crystal display panel 100, the distance between the liquid crystal display panel 100 and the diffusion member 1400 (that is, the housing member 1100) and angles and positions of the infrared cameras 2300 may be adjusted within a predetermined range.

Referring to FIG. 19, an angle θe formed by a virtual line, connecting the liquid crystal display panel 100 and an upper end of the housing member 1100, and the bottom surface of the liquid crystal display panel 100 may be within the range of about 30° to about 55°. For example, the angle θe may be within the range of about 30° to about 50° because the housing member 1100 is larger than the liquid crystal display panel 100. Therefore, the space between the liquid crystal display panel 100 and the housing member 1100 can be shaped like a trapezoid. The angle θe controls a distance De (that is, a width of a gap) between the housing member 1100 and the liquid crystal display panel 100 and a length Le of a portion of the housing member 1100 protruding from a side surface of the liquid crystal display panel 100. That is, the length Le is similar to the width of the body 1210 of the mold frame 1200-1, and the distance De is similar to a length of each of the mold sidewalls 1270.

Therefore, if the length Le is increased, the width of the body 1210 of the mold frame 1200-1, disposed on each side of the liquid crystal display panel 100, increases. As a result, the surface size of the entire display system is increased. If the distance De is increased, the length of the mold sidewalls 1270 of the mold frame 1200-1 under the liquid crystal display panel 100 increases, thereby increasing the thickness of the backlight assembly 1000. Consequently, the thickness of the entire display system is increased. In an exemplary embodiment, the angle θe formed by the housing member 1100 and the liquid crystal display panel 100 may be controlled within the above range. For example, the angle θe may be about 45°, and the length Le may be equal to the distance De. In an exemplary embodiment, a ratio of the length Le to the distance De may vary according to the angle θe and a region to which the display system is applied.

Referring to FIG. 21, the infrared cameras 2300 are installed near the short sides of the liquid crystal display panel 100. Therefore, the length Le and the distance De may be sufficient to allow each of the infrared cameras 2300 to photograph an area corresponding to half of the length of a long side of the liquid crystal display panel 100.

Each of the infrared cameras 2300 can be disposed on the mold-fixing protrusion 1271 of each of the mold sidewalls 1270. Since the infrared cameras 2300 are disposed diagonally under the liquid crystal display panel 100, a center view-angle line CAL of each of the infrared cameras 2300 may not be perpendicular to the bottom surface of the liquid crystal display panel 100. For example, a center view-angle line CAL of each of the infrared cameras 2300 may be at a predetermined angle θa with respect to the bottom surface of the liquid crystal display panel 100. Accordingly, a photographing range of each of the infrared cameras 2300 can be widened. The number of infrared cameras required to photograph the front region of the liquid crystal display panel 100 can be reduced. If the center view-angle line CAL of each of the infrared cameras 2300 is perpendicular to the bottom surface of the liquid crystal display panel 100, the infrared cameras 2300 may be able to photograph only the bottom surface of the body 1210 of the mold frame 1200-1, but may not be able to photograph the liquid crystal display panel 100.

Thus, in an exemplary embodiment, the angle θa formed by the center view-angle line CAL of each of the infrared cameras 2300 and the bottom surface of the liquid crystal display panel 100 may be controlled within the range of about 40° to about 70°. For example, the angle θa may be within the range of about 50° to about 60°. The center view-angle line CAL refers to a line passing through the center of an angle of view which is a photographing angle of each of the infrared cameras 2300. That is, each of the infrared cameras 2300 has a vertical angle of view 2*V θ L and a horizontal angle of view 2*H θ L. Therefore, the center view-angle line CAL refers to a line passing through the center of each of the horizontal and vertical angles of view 2*H θ L and 2*V θ L.

Referring to FIGS. 19 and 21, the center view-angle line CAL bisects each of the vertical and horizontal angles of view 2*V θ L and 2*H θ L. Each of the vertical and horizontal angles of view 2*V θ L and 2*H θ L of each of the infrared cameras 2300 may be about 60° to about 160°, for example, about 60° to about 110°. The vertical and horizontal angles of view 2*V θ L and 2*H θ L of each of the infrared cameras 2300 may vary according to the size of the liquid crystal display panel 100 photographed. That is, the vertical angle of view 2*V θ L may be greater than the horizontal angle of view 2*H θ L and vice versa.

If the angle θa formed by the center view-angle line CAL of each of the infrared cameras 2300 and the bottom surface of the liquid crystal display panel 100 is smaller than the above range, an area of the liquid crystal display panel 100 which can be photographed by each of the infrared cameras 2300 is increased. However, an image captured by each of the infrared cameras 2300 is distorted.

For example, referring to FIG. 19, an angle θa-1 formed by a center view-angle line CAL-1 of an infrared camera and the bottom surface of the liquid crystal display panel 100 is 90°, an image captured by the infrared camera may roughly be square as shown in (a) of FIG. 20. That is, four sides of image have the same length.

Referring to FIG. 20, if the angle θa-1 formed by the center view-angle line CAL-1 of the infrared camera and the bottom surface of the liquid crystal display panel 100 is not 90°, an image captured by the infrared camera is trapezoidal. That is, the captured image shown in (b) of FIG. 20 has a short side rh and a long side lh. To accurately interpret the captured image, a value obtained by dividing a value of a length of the short side rh by a value of a length rv between the short side rh and the long side lh should be within the range of about 0.2 to about 1. For example, the length of the short side rh should be more than 50% of the length of the long side lh.

The angle θa formed by the center view-angle line CAL and the bottom surface of the liquid crystal display panel 100 may be within the range of about 40° to about 70°. That is, if the angle θa is less than 40°, the length of the short side rh may become less than 50% of the length of the long side lh, and the length rv between the short side rh and the long side lh may be increased. As a result, an image captured by the infrared camera is distorted. If the angle θa is greater than about 70°, an area of the liquid crystal display panel 100 which can be photographed by the infrared camera is reduced. Therefore, not all of an intended photographing range (i.e., about half of the region of the liquid crystal display panel 100) can be photographed by the infrared camera.

Referring to FIG. 19, a part of the vertical angle of view 2*V θ L of each of the infrared cameras 2300 may extend to the mold frame 1200-1. Thus, only a part of a region photographed by each of the infrared cameras 2300 is an active region that can be used (that is, a photographed region of the liquid crystal display panel 100). In an exemplary embodiment, the active region may be wider than an inactive region (that is, a photographed region of the mold frame 1200-1).

Each of the infrared cameras 2300 may tilt such that its center view-angle line CAL is at the above angle with respect to the bottom surface of the liquid crystal display panel 100. The mounting substrate 2200, on which each of the infrared cameras 2300 is mounted, may tilt with respect to the liquid crystal display panel 100 (or the diffusion member 1400). Accordingly, a portion of a top surface of the mold-fixing protrusion 1271 of each of the sidewalls 1271 tilts, and the mounting substrate 2200 is placed on the tilting portion.

In an exemplary embodiment, the infrared cameras 2300 are disposed diagonally under two short sides of the liquid crystal display panel 100, respectively, to photograph (i.e., sense) the front region of the liquid crystal display panel 100. In an exemplary embodiment, each of the infrared cameras 2300 may be placed at an optimal position, and an angle formed by each of the infrared cameras 2300 and the liquid crystal display panel 100 may be controlled within an optimal range to prevent image distortion and enhance the detection capability of the infrared cameras 2300. An increase in the surface size and thickness of the display system can be restrained, and the luminance uniformity and visibility of the liquid crystal display panel 100 can be improved.

For example, referring to FIGS. 22 and 23, a plurality of infrared cameras 2300 may be placed diagonally under two long sides of a liquid crystal display panel 100 to photograph a front region of the liquid crystal display panel 100. That is, referring to FIG. 22, two infrared cameras 2300 are placed diagonally under each of the long sides of the liquid crystal display panel 100. Thus, a total of four infrared cameras 2300 are used to photograph the front region of the liquid crystal display panel 100. Referring to FIG. 23, three infrared cameras 2300 are placed diagonally under each of the long sides of the liquid crystal display panel 100 to photograph the front region of the liquid crystal display panel 100.

Referring to FIGS. 22 and 23, when the infrared cameras 2300 are installed adjacent a long side of the liquid crystal display panel 100, the infrared cameras 2300 may be separated from the long side of the liquid crystal display panel 100 such that the infrared cameras 2300 can photograph an area of the liquid crystal display panel 100 corresponding to at least half VL of a length 2VL of a short side of the liquid crystal display panel 100. A distance De between a housing member 1100 and the liquid crystal display panel 100 and a length Le of a portion of the housing member 1100, protruding from a side surface of the liquid crystal display panel 100, may be controlled within a predetermined range. In an exemplary embodiment, the predetermined range may vary according to an angle θe formed by the housing member 2200 and the liquid crystal display panel 100.

In exemplary embodiments, four or six infrared cameras 2300 are used to photograph the front region of the liquid crystal display panel 100. In an exemplary embodiment, four infrared cameras 2300 are used to photograph the front region (i.e., a top surface region) of the 32-inch liquid crystal display panel 100. In the exemplary embodiment, a length HL of a region of a long side of the liquid crystal display panel 100, which is photographed by each of the infrared cameras 2300, may be greater than half of a length of the long side of the liquid crystal display panel 100. In the exemplary embodiment, a length VL of a region of a short side of the liquid crystal display panel 100, photographed by each of the infrared cameras 2300, may be greater than half of a length of the short side of the liquid crystal display panel 100.

Since the liquid crystal display panel 100 is 32 inches, the length HL of the region of the long side photographed by each of the infrared cameras 2300 may be 350 mm, and the length VL of the region of the short side photographed by each of the infrared cameras 2300 may be 192 mm. When the angle θe formed by a virtual line, connecting the liquid crystal display panel 100 and an upper end of the housing member 1100, and a bottom surface of the liquid crystal display panel 100 is 45°, the distance De between the housing member 1100 and the liquid crystal display panel 100 may be 107 mm, and the length Le of the portion of the housing member 1100, protruding from the side surface of the liquid crystal display panel 100, may be 201 mm.

In an exemplary embodiment, an angle θa formed by a center view-angle line CAL of each of the infrared cameras 2300 and the bottom surface of the liquid crystal display panel 100 is 56.2°. A vertical angle of view 2*V θ L of each of the infrared cameras 2300 may be 100°, and a horizontal angle of view 2*H θ L of each of the infrared cameras 2300 may be 74°. If angles and lengths are set as described above, the four infrared cameras 2300 can photograph the entire top surface region (i.e., the front region) of the liquid crystal display panel 100.

When six infrared cameras 2300 are used in an exemplary embodiment, the length HL of the region of the long side of the liquid crystal display panel 100, photographed by each of the infrared cameras 2300, may be 233 mm, and the length VL of the region of the short side of the liquid crystal display panel 100, photographed by each of the infrared cameras 2300, may be 192 mm. Since one more infrared camera is installed near each of the long sides of the liquid crystal display panel 100 as compared to the previous embodiment, the length HL of the region of each long side of the liquid crystal display panel 100, photographed by each of the infrared cameras 2300, is reduced.

The angle θe formed by a virtual line, connecting the liquid crystal display panel 100 and an upper end of the housing member 1100, and the bottom surface of the liquid crystal display panel 100 is 45°. An angle θa formed by a center view-angle line CAL of each of the infrared cameras 2300 and the bottom surface of the liquid crystal display panel 100 is 50.4°. In an exemplary embodiment, a vertical angle of view 2*V θ L of each of the infrared cameras 2300 may be 92°, and a horizontal angle of view 2*H θ L of each of the infrared cameras 2300 may be 64°. If angles and lengths are set as described above, the six infrared cameras 2300 can photograph the entire top surface region (i.e., the front region) of the liquid crystal display panel 100.

The number of infrared cameras used is not limited to the above embodiments and may be increased or reduced. The infrared cameras are installed diagonally under the long and short sides of the liquid crystal display panel 200 to photograph the entire front region of the liquid crystal display panel 100.

In a display system according to an exemplary embodiment, the infrared light sources 2100 may be installed in an upper region of the liquid crystal display panel 100 or installed adjacent the infrared cameras 2300. The light source units 1300 may be light-emitting diodes.

In an exemplary embodiment, the tilting mold-fixing protrusion 1271 is formed on each of the mold sidewalls 1270 of the mold frame 1200-1 to maintain the angle θa formed by the center view-angle line CAL of each of the infrared cameras 2300 and the bottom surface of the liquid crystal display panel 100 within a predetermined range. In an exemplary embodiment, a concave groove, cut into each of the mold sidewalls 1270, may be formed. Alternatively, a portion of the housing member 1100 may be protruded, and each of the infrared cameras 2300 may be placed on an end of the protruding portion of the housing member 1100.

In an exemplary embodiment, a plurality of infrared cameras are placed between a liquid crystal display panel and a diffusion member. In an exemplary embodiment, the infrared cameras are disposed diagonally under the liquid crystal display panel to enhance the visibility of the liquid crystal display panel and reduce a dark portion.

In an exemplary embodiment, each of the infrared cameras is placed such that a center view-angle line of each of the infrared cameras tilts with respect to the liquid crystal display panel, thereby widening an effective photographing range of each of the infrared cameras.

In an exemplary embodiment, a plurality of light source units and a plurality of diffusion members are placed respectively on inner surfaces of sidewalls of a housing member shaped like a pillar whose lower region is smaller than an upper region (that is, shaped like an upside-down truncated quadrangular pyramid). In an exemplar embodiment, an infrared detector is placed in the lower region of the housing member. Therefore, the luminance uniformity and visibility of a liquid crystal display (LCD) can be enhanced, and the object detection capability of the infrared cameras can be improved.

Since an exemplary embodiment of the present invention inserts the sidewalls of the housing member into concave grooves of couplers, a manufacturing process of the housing member can be simplified.

In an exemplary embodiment of the present invention, the intensity of luminance of light source units in lower side regions of the sidewalls of the housing member increases as compared to those in upper side regions thereof. Therefore, uniform luminance can be provided to the liquid crystal display panel, and a dark portion created by the infrared detector in the lower region of the housing member can be removed.

In an exemplary embodiment of the present invention, a front surface of the liquid crystal display panel is photographed by using a plurality of infrared cameras, thereby reducing the thickness of a display system.

Although exemplary embodiments of the present invention have been described herein with reference to the accompanying drawings, it is to be understood that the present invention should not be limited thereto and that various other changes and modifications may be affected therein by one of ordinary skill in the related art without departing from the scope or spirit of the invention. All such changes and modifications are intended to be included within the scope of the invention.

What is claimed is:

1. A display system comprising:
a housing member having space therein;
a plurality of light source units placed in the space of the housing member;
a diffusion member disposed on the light source units;
a liquid crystal display panel disposed on the diffusion member;
an infrared camera unit interposed between the liquid crystal display panel and the diffusion member, the infrared camera unit photographing a front region of the liquid crystal display panel; and
a plurality of infrared light sources emitting infrared light to the front region of the liquid crystal display panel.

2. The display system of claim 1, wherein the infrared camera unit is placed diagonally under the liquid crystal display panel, and an angle formed by a center view-angle line of the infrared camera unit and a bottom surface of the liquid crystal display panel is about 40° to about 70°.

3. The display system of claim 2, wherein the angle formed by the center view-angle line of the infrared camera unit and the bottom surface of the liquid crystal display panel is about 50° to about 60°.

4. The display system of claim 2, further comprising:
a mold frame coupled to an upper region of the housing member and fixing the liquid crystal display panel;
an image controller controlling an operation of the liquid crystal display panel; and
a computing unit controlling an operation of the infrared camera unit and the infrared light sources and controlling the image controller based on outputs of the infrared camera unit.

5. The display system of claim 4, wherein the mold frame comprises:
a body shaped like a four-sided polygon, the body fixing and supporting the liquid crystal display panel; and
mold sidewalls extending downward from edges of the body, and having lower ends coupled to the housing member,
wherein the infrared camera unit is placed under the body of the mold frame.

6. The display system of claim 5, wherein the mold frame comprises a fixing protrusion protruding from a region of each of the mold sidewalls between the housing member and the body, or a concave groove cut into a region of each of the mold sidewalls between the housing member and the body, and
wherein the infrared camera unit is fixed onto the fixing protrusion or the concave groove, and a surface of the fixing protrusion or the concave groove, contacting the infrared camera unit, tilts.

7. The display system of claim 6, wherein the infrared light sources are disposed under the diffusion member, on the mold sidewalls of the mold frame, on the fixing protrusion, or the concave groove.

8. The display system of claim 4, wherein a portion of an upper end region of the housing member, coupled to the mold frame, protrudes, and the infrared camera unit is placed on the protruding portion.

9. The display system of claim 2, wherein the space within the housing member is larger than the liquid crystal display panel, and an angle formed by a virtual line, connecting a lower end of the liquid crystal display panel and an upper end of the housing member, and the bottom surface of the liquid crystal display panel is about 30° to about 55°.

10. The display system of claim 9, wherein a plurality of infrared cameras are placed adjacent each long side, each short side, or long and short sides of the liquid crystal display panel, and the infrared camera unit comprises a mounting substrate and an infrared camera mounted on the mounting substrate.

11. The display system of claim 10, wherein the infrared camera unit photographs an area, corresponding to at least half of a length of a long side of the liquid crystal display panel, when the infrared camera units are placed adjacent the short side of the liquid crystal display panel, and
the infrared camera unit photographs an area, corresponding to at least half of a length of a short side of the liquid crystal display panel, when the infrared cameras unit is placed adjacent the long side of the liquid crystal display panel.

12. The display system of claim 10, wherein the infrared light sources are mounted on the mounting substrate.

13. The display system of claim 2, further comprising a cover unit covering upper edge regions of the liquid crystal display panel,
wherein the infrared light sources are disposed under the cover unit.

* * * * *